United States Patent
Yokoi

(10) Patent No.: US 10,543,803 B2
(45) Date of Patent: Jan. 28, 2020

(54) AIRBAG BASE FABRIC AND MANUFACTURING METHOD THEREFOR

(71) Applicant: Toray Industries, Inc., Tokyo (JP)

(72) Inventor: Daisuke Yokoi, Osaka (JP)

(73) Assignee: Toray Industries, Inc., Tokyo (JP)

( * ) Notice: Subject to any disclaimer, the term of this patent is extended or adjusted under 35 U.S.C. 154(b) by 445 days.

(21) Appl. No.: 15/125,207

(22) PCT Filed: Mar. 13, 2015

(86) PCT No.: PCT/JP2015/057535
§ 371 (c)(1),
(2) Date: Sep. 12, 2016

(87) PCT Pub. No.: WO2015/137495
PCT Pub. Date: Sep. 17, 2015

(65) Prior Publication Data
US 2017/0067189 A1  Mar. 9, 2017

(30) Foreign Application Priority Data
Mar. 14, 2014 (JP) .................... 2014-051348

(51) Int. Cl.
*B60R 21/235* (2006.01)
*D03D 1/02* (2006.01)
(Continued)

(52) U.S. Cl.
CPC .......... *B60R 21/235* (2013.01); *D03D 1/02* (2013.01); *D03D 15/0083* (2013.01);
(Continued)

(58) Field of Classification Search
CPC .......... B60R 2021/23509; B60R 2021/23538; B60R 2021/23542; B60R 21/235;
(Continued)

(56) References Cited

U.S. PATENT DOCUMENTS 5,952,250 A * 9/1999 Kim .................... B60R 21/235
                                                    280/728.1
6,074,701 A    6/2000 Beasley, Jr.
(Continued)

FOREIGN PATENT DOCUMENTS

JP    01-118641 A    5/1989
JP    06-192938 A    7/1994
(Continued)

OTHER PUBLICATIONS

Supplementary European Search Report dated Oct. 17, 2017, of corresponding European Application No. 15762013.9.
(Continued)

*Primary Examiner* — Arti Singh-Pandey
(74) *Attorney, Agent, or Firm* — DLA Piper LLP (US)

(57) ABSTRACT

An airbag base fabric satisfying characteristics A to D:
(A) the cross-sectional deformation (WR), calculated by formula (1), of multifilament warp threads constituting a textile is 4.0 to 6.0, $WR$=(Major axis of warp thread cross section in textile)/(Minor axis of warp thread cross section in textile)    (1)

(B) the cross-sectional deformation (FR), calculated by formula (2), of multifilament weft threads constituting the textile is 2.4 to 4.0, $FR$=(Major axis of weft thread cross section in textile)/(Minor axis of weft thread cross section in textile)    (2)

(C) the single fiber cross-sectional shape of the multifilament threads constituting the textile is substantially circular, and
(D) the multifilament threads constituting the textile have total fineness of 145 to 720 dtex, single fiber fineness of 2 to 7 dtex, and tensile strength of 6.5 to 8.5 cN/dtex.

10 Claims, 3 Drawing Sheets

(51) Int. Cl.
  *D03D 15/00* (2006.01)
  *D03D 25/00* (2006.01)
  *D06B 3/10* (2006.01)
  *D06C 7/02* (2006.01)
(52) U.S. Cl.
  CPC ............. *D03D 25/005* (2013.01); *D06B 3/10* (2013.01); *B60R 2021/23509* (2013.01); *B60R 2021/23538* (2013.01); *B60R 2021/23542* (2013.01); *D03D 2700/03* (2013.01); *D06C 7/02* (2013.01); *D10B 2331/02* (2013.01); *D10B 2505/124* (2013.01)
(58) Field of Classification Search
  CPC .... D03D 15/0088; D03D 1/02; D03D 25/005; D03D 2700/03; D03D 41/00; D06B 3/10; D06B 3/00; D06B 7/02; D10B 2331/02; D10B 2505/124
  See application file for complete search history.

(56) References Cited

U.S. PATENT DOCUMENTS

| | | | |
|---|---|---|---|
| 2005/0089654 A1* | 4/2005 | Yu ........................ | B60R 21/235 428/34.1 |
| 2005/0142969 A1* | 6/2005 | Yu ........................... | D01F 6/60 442/181 |
| 2011/0020628 A1* | 1/2011 | Fukudome ............ | C08G 69/26 428/221 |
| 2014/0021704 A1 | 1/2014 | Kim et al. | |

FOREIGN PATENT DOCUMENTS

| | | |
|---|---|---|
| JP | 09-279437 A | 10/1997 |
| JP | 10-037039 A | 2/1998 |
| JP | 2002-500290 A | 1/2002 |
| JP | 2002-220777 A | 8/2002 |
| JP | 2003-171841 A | 6/2003 |
| JP | 2003-293240 | 10/2003 |
| JP | 2005-105445 A | 4/2005 |
| JP | 2005-105446 | 4/2005 |
| JP | 2006-118084 A | 5/2006 |
| JP | 2008-138305 A | 6/2008 |
| JP | 2009-256860 A | 11/2009 |
| JP | 2013-523524 A | 6/2013 |
| JP | 5440967 B1 | 3/2014 |
| WO | 1993/005985 A1 | 4/1993 |
| WO | 2011/055562 A1 | 5/2011 |
| WO | 2013/133382 A1 | 9/2013 |
| WO | 2014/098083 A1 | 6/2014 |

OTHER PUBLICATIONS

The First Office Action dated Apr. 27, 2017, of corresponding Chinese Application No. 201580013781.0, along with an English translation.

The Second Office Action dated Nov. 8, 2017, of corresponding Chinese Application No. 201580013781.0, along with an English translation.

* cited by examiner

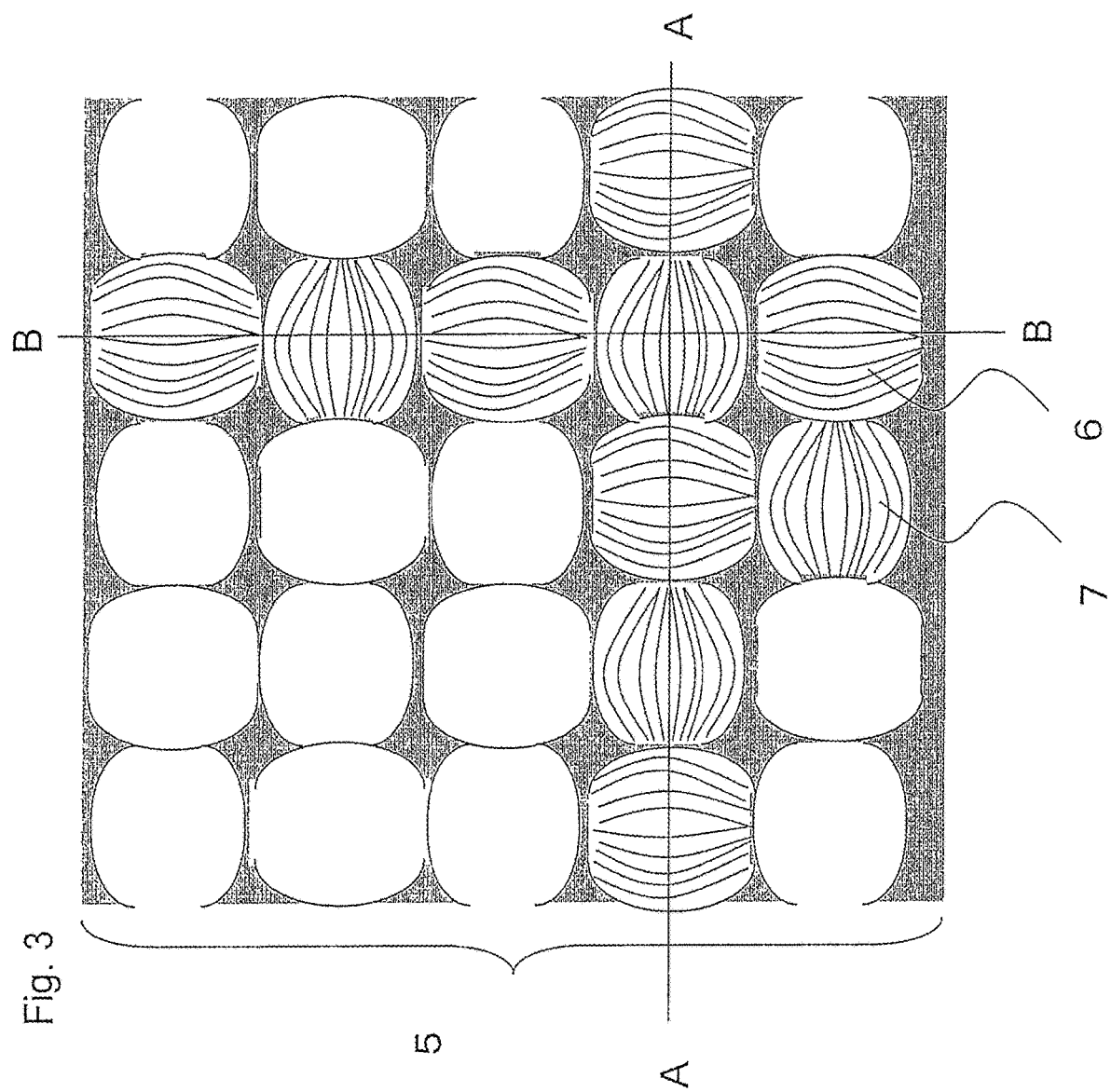

AIRBAG BASE FABRIC AND MANUFACTURING METHOD THEREFOR

TECHNICAL FIELD

This disclosure relates to an airbag base fabric used for an airbag cushion constituting an airbag used as a safety apparatus at the time of an automotive accident, and a method of manufacturing the same.

BACKGROUND

In recent years, with increased traffic safety consciousness, air bags are used to ensure safety of passengers in the occurrence of automobile accident. Its effectiveness is recognized with developments of various airbags, and air bags are rapidly put to practical use.

The airbag receives passengers moving by a reaction of collision and absorbs its impact to protect passengers by being expanded and deployed in an extremely short time upon collision of vehicles. On the other hand, when automobiles are used normally, the airbag is folded and stored since it is not used. If the weight of the airbag can be reduced, vehicle weight can be reduced. If the airbag can be compactly folded, the space to store the airbag can be reduced and, hence, an interior space can be widened. Therefore, concerning the base fabric constituting an airbag cushion, requirements for lightweight properties and compactness are increased to increase an interior space and improve fuel economy.

On the other hand, concerning a gas generator (inflator) which has a large weight ratio among parts constituting the airbag, requirements for lightweight properties and compactness are increased, and a lightweight and low-cost pyro-inflator is becoming a mainstream in place of a cold inflator using compressed gas and a high-pressure gas vessel and a hybrid inflator using a gunpowder in combination with compressed gas. The pyro-inflator principally generates a gas with the gunpowder, and therefore a gas generated has a high-temperature and is rapidly thermally expanded, and therefore, high heat resistance and mechanical properties are required of the airbag base fabric.

Conventionally, as a means to enhance heat resistance of the airbag base fabric and achieve lightweight properties and compactness, a coated base fabric having a thermosetting silicone resin applied thereto, and a coated base fabric having a film bonded thereto are proposed. However, since the coated base fabric uses an expensive resin, it has a problem that cost is high compared to the base fabric to which a resin is not applied (hereinafter, may be referred to as a non-coated).

Thus, to solve such problems, development of a non-coated base fabric is performed. For example, an airbag base fabric is disclosed which is excellent in compactness while retaining adequate low air permeability as a non-coated base fabric and mechanical properties by shaping a single fiber cross section of a synthetic fiber multifilament constituting a non-coated base fabric into a flat shape, and drawing up cross sections of single fibers (refer to Japanese Patent Laid-Open Publication No. 2003-171841). Moreover, a manufacturing method of an airbag base fabric that can achieve further low air permeability by applying shrinking to an textile woven using the threads in which single fiber cross sections are flat, is disclosed (refer to Japanese Patent Laid-Open Publication No. H10-37039).

However, when producing an airbag cushion using the airbag base fabric, particularly in applications of airbags for a driver's seat and a passenger's seat, after sewing a cushion in the form of a bag, the cushion is reversed to arrange a sewn portion on an inner side, and thereafter the cushion is folded, and on this occasion, the base fabric is kneaded. Naturally, a base fabric using flat threads can be used for a conventional reversing work or folding work without problems. However, by a recent increasing requirement for compactness, to reduce a cushion volume after folding, a folding nature is given by a stronger force, or to be housed in a very narrow package, the cushion is kneaded by a stronger force. In this time, arrangement of the single fibers drawn up in the base fabric portion constituting a cushion is disordered, and there is a concern that air permeability may be increased, and therefore an airbag base fabric composed of threads having a circular cross section which is low in change of air permeability with respect to strong kneading, which is thin and compact, is required.

Further, for example, to provide a non-coated base fabric having low air permeability and is flexible, lightweight and inexpensive, widths of threads of warp threads and weft threads constituting the base fabric are increased (refer to Japanese Patent Laid-Open Publication No. 2005-105445), and an airbag base fabric which is lightweight and excellent in package ability while retaining mechanical properties and flame retardancy by setting relative viscosity of synthetic fiber multifilament constituting, an amount of amino-terminals and characteristics of decomposed woven threads to specific ranges is developed (refer to Japanese Patent Laid-Open Publication No. H09-279437), and an airbag textile in which to reduce the weight of an inflator itself by efficiently using an inflator gas, characteristics of decomposed threads of polyamide fibers constituting the textile, and air permeability of the textile and a state of thread width are set to specific ranges is developed (refer to International Publication WO 2011/055562).

However, in recent years, the number of sites equipped with an airbag increases such as a knee airbag that protects knees, a rear airbag that protects passengers in a rear seat from rear-end collision, and an airbag for a pedestrian that protects a pedestrian, and requirements for lightweight properties and small thickness of the airbag base fabric are increasing, but the airbag base fabric satisfying these requirements has not yet been developed.

It could therefore be helpful to provide an airbag base fabric which is lightweight and thin while retaining mechanical properties and low air permeability required of an airbag base fabric, and a method of manufacturing the airbag base fabric.

SUMMARY

We thus provide:
(1) An airbag base fabric satisfying the following characteristics of A to D:
  (A) the cross-sectional deformation (WR), calculated by a formula (1), of multifilament warp threads constituting a textile is 4.0 to 6.0, $WR$=(Major axis of warp thread cross section in textile)/(Minor axis of warp thread cross section in textile) (1)

(B) the cross-sectional deformation (FR), calculated by a formula (2), of multifilament weft threads constituting the textile is 2.4 to 4.0, $FR$=(Major axis of weft thread cross section in textile)/(Minor axis of weft thread cross section in textile) (2)

(C) the single fiber cross-sectional shape of the multifilament threads constituting the textile is substantially circular, and (D) the multifilament threads constituting the textile have total fineness of 145 to 720 dtex, single fiber fineness of 2 to 7 dtex, and tensile strength of 6.5 to 8.5 cN/dtex.

(2) An airbag base fabric obtained by using synthetic fiber multifilament threads in which total fineness is 150 to 700 dtex, single fiber fineness is 2 to 7 dtex, tensile strength of multifilament threads is 8.0 to 9.5 cN/dtex, and the single fiber cross-sectional shape is circular, which satisfies the following characteristics of A to C:

(A) the cross-sectional deformation (WR), calculated by a formula (1), of multifilament warp threads constituting a textile is 4.0 to 6.0, $$WR = \text{(Major axis of warp thread cross section in textile)}/\text{(Minor axis of warp thread cross section in textile)} \quad (1)$$

(B) the cross-sectional deformation (FR), calculated by a formula (2), of multifilament weft threads constituting the textile is 2.4 to 4.0, and $$FR = \text{(Major axis of weft thread cross section in textile)}/\text{(Minor axis of weft thread cross section in textile)} \quad (2)$$

(C) the single fiber cross-sectional shape of the multifilament threads constituting the textile is substantially circular.

The following constitute preferred examples of the base fabric.

(3) The airbag base fabric according to any one of the above-mentioned paragraphs (1) and (2), wherein the warp thread cross-sectional deformation (WR) calculated by the formula (1) is 4.3 to 5.7, and the weft thread cross-sectional deformation (WR) calculated by the formula (2) is 2.6 to 3.7.

(4) The airbag base fabric according to any one of the above-mentioned paragraphs (1) to (3), wherein static air permeability measured under a test differential pressure of 500 Pa according to a fragile form method of JIS L 1096 is 0.1 to 5.0 L/dm²/min, and dynamic air permeability measured according to ASTM D 6476-02 is 100 to 1000 mm/sec.

(5) The airbag base fabric according to any one of the above-mentioned paragraphs (1) to (4), wherein a warp thread cover factor (WCF) is calculated by a formula (3), a weft thread cover factor (FCF) is calculated by a formula (4), and a sum (CF) of WCF and FCF, calculated by a formula (5), is 2000 to 2400:

$$WCF = \text{(Total fineness of warp threads constituting textile (dtex))}^{1/2} \times \text{(Warp thread density (number of threads/2.54 cm))} \quad (3)$$

$$FCF = \text{(Total fineness of weft threads constituting textile (dtex))}^{1/2} \times \text{(Weft thread density (number of threads/2.54 cm))} \quad (4)$$

$$WCF + FCF = CF \quad (5).$$

(6) The airbag base fabric according to any one of the above-mentioned paragraphs (1) to (5), which is not coated with a resin.

An application for which our base fabric is used includes the following.

(7) An airbag using any one of the above-mentioned airbag base fabrics.

A method of manufacturing any one of the above-mentioned airbag base fabrics includes the following method.

(8) A method of manufacturing the airbag base fabric according to any one of the above-mentioned paragraphs (1) to (6), comprising:

i) a step of obtaining a gray fabric by undergoing a warp thread preparation step and a weaving step in turn; and ii) a step of unwinding the obtained gray fabric from an unwinding machine, a step of scouring the resulting gray fabric by an open soaper type scouring machine, a step of drying the resulting gray fabric in a drier, a step of performing heat setting of the resulting gray fabric in a pin tenter, and a step of winding the resulting gray fabric with a winding machine, wherein in regions between the unwinding machine and an inlet of the pin tenter and between an outlet of the pin tenter and the winding machine, a tensile force of 10 to 50 kgf (98 to 490 N)/m per width of the gray fabric dried by the drier is provided in a warp thread direction of the gray fabric, and in the step of performing heat setting, tentering is performed such that a textile width becomes in the range of 98 to 100.5% with respect to a width of the gray fabric dried by a drier, and a heat setting temperature is set to 120 to 180° C., and the step of the above ii) does not include calendering.

(9) The method of manufacturing an airbag base fabric according to the above-mentioned paragraph, wherein the warp thread preparation step includes a step of preparing a rough-wound beam with a rough-wound warping machine, and then preparing a woven cloth beam with a beaming machine without sizing.

According to the airbag base fabric as described below, it is possible to attain an airbag base fabric which is lightweight and thin and has low air permeability even though being non-coated while retaining mechanical properties, and an airbag.

BRIEF DESCRIPTION OF THE DRAWINGS

FIG. 3 is a schematic view for explaining a cutting line to a textile in sample preparation for photographing a SEM photograph cross-sectional view of FIG. 1 and FIG. 2.

DESCRIPTION OF REFERENCE SIGNS

Figure 1:
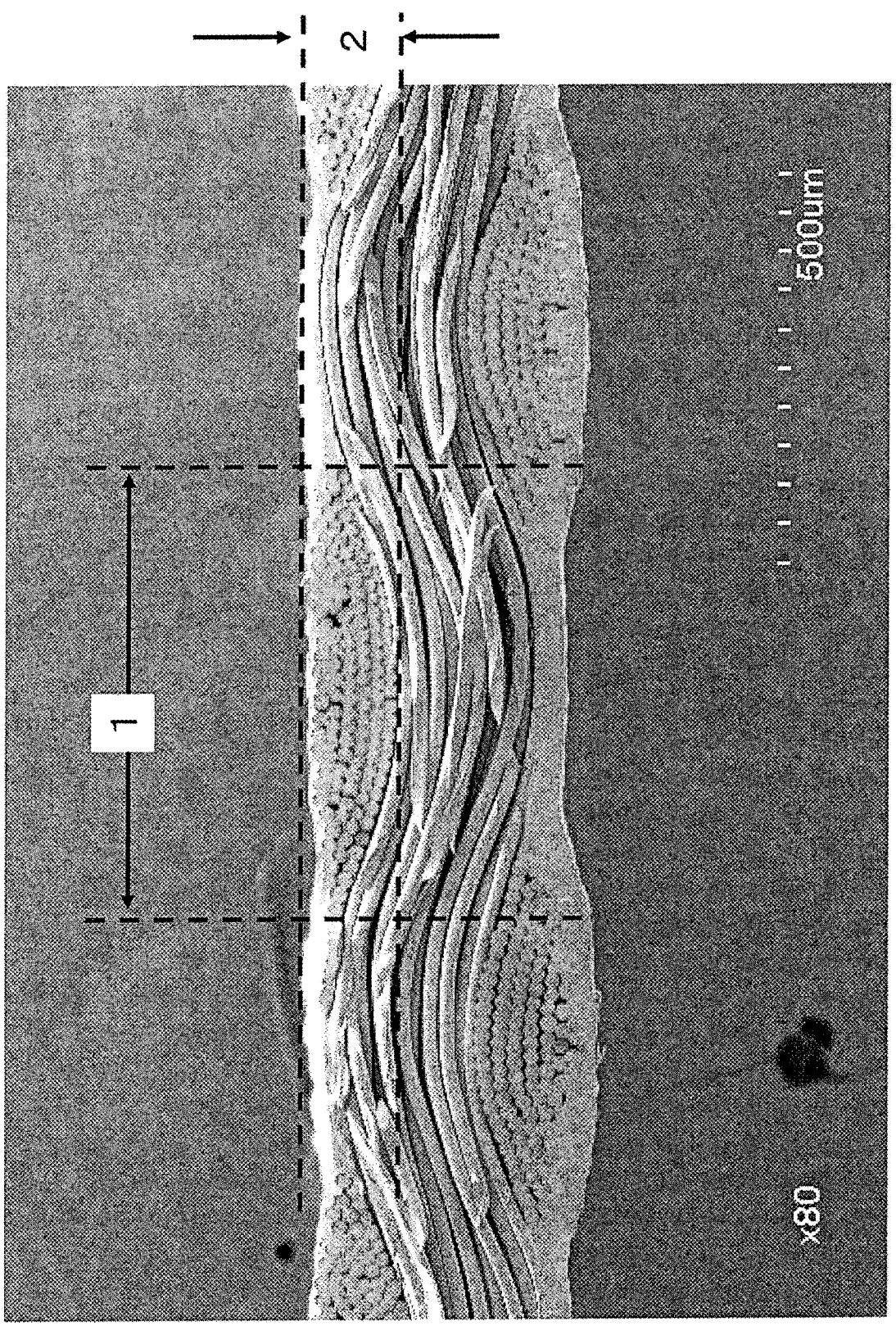
FIG. 1 shows a SEM photograph obtained by photographing a cross-sectional structure of warp threads of an airbag base fabric.

1: Major axis of a warp thread cross section
2: Minor axis of a warp thread cross section
3: Major axis of a weft thread cross section
4: Minor axis of a weft thread cross section
5: Textile after processing
6: Warp thread
7: Weft thread
A-A: Cut line for taking a photograph of a warp thread cross section
B-B: Cut line for taking a photograph of a weft thread cross section

DETAILED DESCRIPTION

Hereinafter, our base fabrics, methods and applications will be described in detail.

Total fineness of synthetic fiber multifilament used to manufacture an airbag base fabric is preferably 150 to 700 dtex. When the total fineness is low, the tensile strength and the tear strength of the base fabric tend to be reduced. Therefore, productivity of the multifilament thread and the base fabric tends to be decreased. On the other hand, when the fineness is too large, the base fabric tends to become large or its mass tends to increase as a whole when it is housed in the airbag apparatus.

A preferred fineness range to achieve mechanical properties required in deploying the airbag and compactness/lightweight properties in housing the airbag simultaneously is 200 to 600 dtex, and more preferably 300 to 500 dtex.

From the viewpoint of strength and productivity of the multifilament and the base fabric and package ability of the airbag, the fineness of the single fibers is preferably 2 to 7 dtex. Moreover, the fineness of the single fibers is preferably 3 to 6 dtex. When an appropriate single fiber fineness is employed, it is possible to attain an airbag base fabric that is lightweight and thin while retaining mechanical properties and low air permeability required of an airbag base fabric.

The tensile strength of the multifilament thread being used for a textile is preferably 8.0 N/dtex or more to obtain mechanical properties required for the airbag, and preferably 9.2 N/dtex or more. Further, it is preferred that the tensile strength is 9.5 cN/dtex or less, moreover 9.2 cN/dtex or less, and moreover 9.0 cN/dtex or less from the viewpoint that multifilaments are obtained stably.

Elongation at break of the multifilament thread being used for a textile is preferably 20 to 26%, further preferably 21 to 25%, and further preferably 22 to 24% from the viewpoint that it becomes easy to disperse stress exerted on a cushion in deploying the airbag.

In addition, the above-mentioned tensile strength and elongation at break are values measured according to JIS L 1013 8.5.1.

The boiling water shrinkage is a measure of such movement that cross-sectional shapes of the warp thread and the weft thread constituting the textile tend to be closer to a circle due to a scouring temperature or heat setting temperature during processing. When the boiling water shrinkage is small, movement of multifilament threads constituting the textile under processing can be reduced, and therefore the boiling water shrinkage is preferably 3% or more, more preferably 4% or more, and moreover preferably 5% or more, and it is preferably 9% or less, more preferably 8% or less, and moreover preferably 7% or less.

A measurement method of the boiling water shrinkage is as follows. The multifilament threads are sampled in the form of a hank and adjusted in a temperature/humidity adjusting chamber of 20° C. and 65% in RH for 24 hours or more, and a length L1 of the sample was measured with a weight of 0.045 cN/dtex applied to the sample. Then, the sample is immersed in boiled water for 30 seconds in a tension-free state and dried for 4 hours in air in the temperature/humidity adjusting chamber, and a weight of 0.045 cN/dtex is exerted on the sample again, and a length L2 is measured. The boiling water shrinkage is determined based on the following formula from the respective lengths L1 and L2. Measurement is performed three times and an average value is employed.

Boiling water shrinkage=[(L1−L2)/L1]×100(%).

By employing a substantial circle as the single fiber cross-sectional shape of multifilament threads constituting the woven cloth, it becomes possible to retain required air permeability even though the base fabric is kneaded by the reversing work of the cushion. When "substantial circle" is defined, it is preferred that a ratio of major axis/minor axis is 1.1 or less, further 1.05 or less, and further 1.02 or less. To make multifilament threads constituting the woven cloth substantially circular, it is preferred that the single fiber cross-sectional shape of the multifilament to be used is circular. The circle does not have to be a strict circle. For example, the ratio of the major axis/minor axis may exceed 1, and on the other hand, it is preferred that the ratio is 1.1 or less, further 1.05 or less, and further 1.02 or less.

A polymer constituting a synthetic fiber multifilament can be selected from polymers from which polymer array fibers can be obtained, for example, polyamides such as nylon 6,6, nylon 6, nylon 12, nylon 5,6 and nylon 6,10; and homopolymers or copolymer of polyester such as polyethylene terephthalate, polybutylene terephthalate and polyethylene naphthalate. Among these, polyamides and homopolymers of polyester are preferred, and further polyamides such as nylon 6,6 and nylon 6 are preferred in terms of impact resistance.

When the synthetic fiber multifilament threads are produced using such polymers, various additives commonly used to improve productivity or characteristics in the production process or processing step may be contained. For example, a heat stabilizer, an antioxidant, a light stabilizer, a leveling agent, an antistatic agent, a plasticizer, a thickening agent, a pigment and a flame retarder can be contained.

The base fabric has the warp thread cross-sectional deformation (WR) of 4.0 to 6.0 and the weft thread cross-sectional deformation (FR) of 2.4 to 4.0. Then, the single fiber cross-sectional shape of the multifilament threads constituting the textile is substantially circular. Herein, WR and FR are defined as follows:

$$WR=\text{(Major axis of warp thread cross section in textile)/(Minor axis of warp thread cross section in textile)} \quad (1)$$

$$FR=\text{(Major axis of weft thread cross section in textile)/(Minor axis of weft thread cross section in textile)} \quad (2).$$

Figure 2:
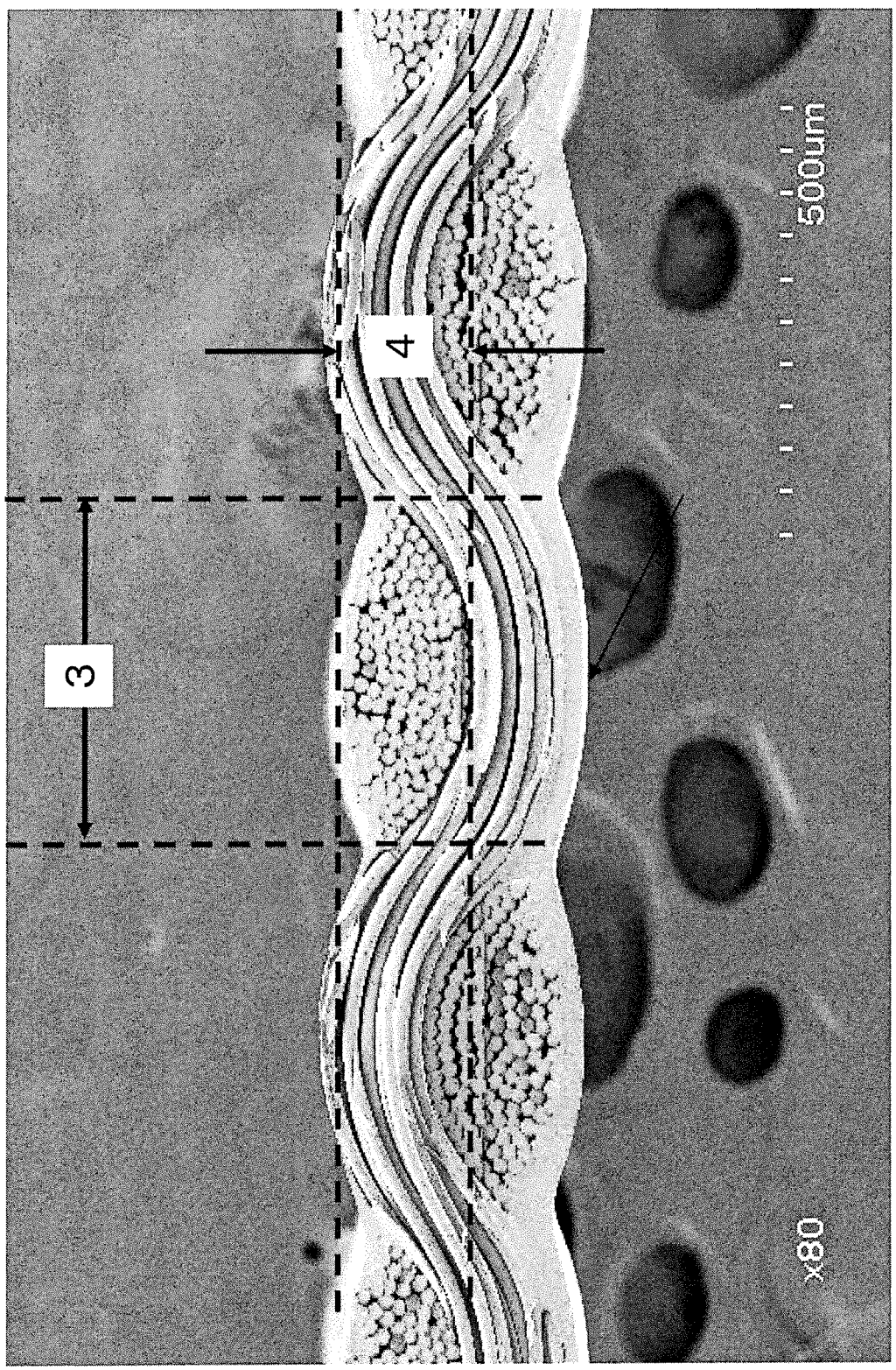
FIG. 2 shows a SEM photograph obtained by photographing a cross-sectional structure of weft threads of an airbag base fabric.

FIGS. 1 and 2 show scanning electron microscope (SEM) photographs obtained by photographing a thread cross-sectional structure of a non-coated airbag base fabric. FIG. 1 shows a photograph obtained by photographing a cross-sectional of the warp threads, and FIG. 2 shows a photograph obtained by photographing a cross-sectional of the weft threads. In addition, the above-mentioned photographs were obtained by fixing the base fabric with a woodworking adhesive by a method described later and photographing a base fabric cross section. In the definition of WR and FR, the terms major axis and minor axis are used. However, as is found in FIGS. 1 and 2, a cross section of the multifilament thread does not have to be elliptic. The major axis of a cross section of the multifilament thread can be said to be a width in a shape of the cross section, and the minor axis can be said to be a thickness in a shape of the cross section.

The warp thread cross-sectional deformation (WR) is a deformation of a warp thread in the textile, an airbag base fabric, and is a value calculated by dividing the major axis 1 of a cross section of a warp thread constituting a textile which is the airbag base fabric by the minor axis 2 of the cross section of the warp thread, for example, as shown in FIG. 1. When this value is larger, the warp thread is broaden in a direction of a width of the textile, a thickness of the base fabric becomes small, and further a crimping rate of the weft thread is decreased. As a result of this, a substantial length of the weft thread existing per unit length in the weft thread direction of the base fabric is shortened, and therefore this shows that the base fabric is lightweight. Further, by drawing up the single fibers constituting the warp threads in a state of near close packing, or by drawing up single fibers at the base fabric surface in a nearly horizontal state, WR can be further increased.

It is important in achieving lightweight properties and thin properties to simultaneously set the warp thread cross-sectional deformation (WR) to 4.0 or more. WR is further preferably 4.3 or more, and further preferably 4.6 or more. Further, it is preferred that WR is 6.0 or less, further 5.7 or less, and further 5.4 or less. A small minor axis indicates that the thickness of the base fabric is small, and a large major axis indicates that the multifilament is broadened. As shown in FIG. 1, by drawing up the single fibers in a state of near close packing in a direction of base fabric plane, and further by drawing up single fibers at the base fabric surface in a nearly horizontal state as far as possible, it becomes possible to be within the above-mentioned range of WR.

The weft thread cross-sectional deformation (FR) is a deformation of a weft thread constituting the textile, an airbag base fabric, and is also a value calculated by dividing the major axis 3 of a cross section of a weft thread by the minor axis 4 of the cross section of the weft thread as with the warp thread cross section, for example, as shown in FIG. 2. When this value is larger, the weft thread is broaden in a direction of a width of the textile, a thickness of the base fabric becomes small, and further a bulge in a thickness direction of the warp thread is reduced and a crimping rate of the warp thread is decreased. As a result of this, a length of the warp thread actually existing per unit length in the warp thread direction of the base fabric is shortened, and therefore this shows that the base fabric is lightweight.

It is important to set the weft thread cross-sectional deformation (FR) to 2.4 or more, preferably 2.6 or more, and more preferably 2.8 or more. Further, it is preferred that FR is 4.0 or less, further 3.7 or less, and further 3.4 or less. The weft threads do not pass through a warp thread preparation step and are inserted in a weaving step, and therefore the weft threads have smaller cross-sectional deformation than the warp threads. However, by similarly drawing up the single fibers in the form of near close packing and further by drawing up single fibers at the base fabric surface in the nearly horizontal form, it becomes possible to be within the above-mentioned range of FR.

When calendering which applies a linear pressure more than 10 N/mm is applied to a textile, even threads having a circular cross section can increase WR and FR. However, when such processing is applied, a cross-sectional shape of the single fiber is excessively deformed and mechanical properties are deteriorated. Therefore, in the non-coated airbag base fabric, it is important that the single fiber has a substantial circle in which there is no trace of strong calendering. The term substantially circle refers to a state in which in the single fiber at the surface of the textile, a part not in contact with neighboring single fibers is arc-shaped. When strongly performing calendering, not only single fibers within the textile but also single fibers at the surface of the textile are crushed in by pressure, and deformed into a polygon such as a quadrangular shape, a hexagonal shape and a pentagonal shape. Even when calendering is not performed, single fibers within the textile may be deformed into a rounded polygon by contact with neighboring single fibers, but are not deformed to such an extent that mechanical properties are deteriorated. Accordingly, since the non-coated airbag base fabric is not subjected to calendering, in the single fibers localized at the textile surface, a part not in contact with neighboring single fibers can retain an arc shape.

Factors to particularly increase WR and FR include characteristics of the threads constituting the textile. The threads constituting the textile referred to herein refers to threads extracted by decomposing the base fabric (hereinafter, referred to as "decomposition threads"). The total fineness of the decomposition threads is preferably 145 dtex or more, more preferably 195 dtex or more, and moreover preferably 300 dtex or more. Further, the total fineness is preferably 720 dtex or less, more preferably 610 dtex or less, and moreover preferably 500 dtex or more. That is, in a manufacturing process of an airbag base fabric described later, by suppressing shrinkage occurrence of the multifilament thread and maintaining the total fineness as far as possible, the single fibers can be drawn up in the form of near close packing and single fibers at the base fabric surface can be drawn up horizontally as far as possible, and this enable to keep the above-mentioned WR and FR within a specific range. When a change rate of the total fineness of the decomposition threads is suppressed to 3 to −2% with respect to the total fineness of the original multifilament threads, it is preferred in that such movement that the single fibers tend to be drawn up is not interfered with. The change rate is more preferably 1 to −1%, and moreover preferably 0.5 to −0.5%. Further, the same holds true with regard to the single fiber fineness of the decomposition threads.

Further, when the airbag base fabric provides mechanical properties capable of resisting airbag use, strength of a thread constituting the base fabric, that is, a thread prepared by decomposition (decomposition thread), also has to be noted. The strength of the decomposition thread is preferably 6.5 cN/dtex or more, further preferably 6.8 cN/dtex or more, and further preferably 7.0 cN/dtex or more. Further, the strength is preferably 8.5 cN/dtex or less, further preferably 8.3 cN/dtex or less, and further preferably 8.0 cN/dtex or less. Usually, the strength of the decomposition thread after producing the base fabric becomes lower than the tensile strength of the multifilament thread before producing the base fabric by a treating temperature at the time when the base fabric passes through various steps described later or friction with parts of the steps. Further, when the weaving density is higher, since threads rub against each other in taking out the decomposition threads from the base fabric, the strength of the decomposition threads is deteriorated similarly. A ratio of the deterioration is set to preferably 20% or less, more preferably 15% or less, and moreover preferably 10% or less with respect to the tensile strength of the multifilament threads before weaving in that a selection of threads such as fluff quality, shrinkage characteristics and tensile strength of the multifilament threads can be expanded. The ratio of the deterioration is more preferably 15% or less, and moreover preferably 10% or less. To achieve the above-mentioned strength of the decomposition threads and the ratio of the deterioration of strength, it is preferred that the multifilament threads are not exposed to excessive tension (e.g., tensile force), a step of pressing and a high-temperature environment of 200° C. or higher when passing through a production step of an airbag base fabric described later. Further, naturally, it is also important not to use parts that damage multifilament threads or textiles in passing through each step. It is important to manufacture an airbag base fabric in a state in which strength of the multifilament threads is retained as far as possible by employing such a production process and conditions.

When the WR and FR are increased as described above, as a result of this, the crimping rate is reduced. However, the crimping rate varies depending on the type of loom, weaving density and relationship between the multifilament threads and the base fabric producing conditions in addition to WR and FR. The crimping rate of the base fabric, as a measure showing thin properties, is preferably 12% or less in the warp thread direction and 6% or less in the weft thread direction, more preferably 10% or less in the warp thread direction and 5% or less in the weft thread direction, and moreover preferably 9% or less in the warp thread direction and 4% or less in the weft thread direction.

When the WR and FR are increased, since the single fibers are arranged and the warp threads are brought into firm contact with the weft threads, the base fabric has lower air permeability than the base fabric having small WR and FR even though the multifilament threads and weaving density are the same. With respect to the air permeability representing air permeable properties of the base fabric, static air permeability measured under a test differential pressure of 500 Pa according to JIS L 1096 is preferably 0.1 to 5.0 L/dm$^2$/min, from the viewpoint of restraint performance of a passenger in deploying the air bag. The static air permeability is further preferably 0.3 to 4.0 L/dm$^2$/min, and further preferably 0.5 to 3.0 L/dm$^2$/min. Further, dynamic air permeability measured according to ASTM D 6476-02 is preferably within a range of 100 to 1000 mm/sec. The dynamic air permeability is further preferably 200 to 800 mm/sec, and further preferably 250 to 650 mm/sec.

Further, the base fabric is kneaded during the reversing work, folding work or housing work of the cushion. When change in air permeability is small against such a kneading, restraint performance of a passenger in deploying the air bag is stabilized. That is, the static air permeability after abrasion test preferably has a change rate within 2.0 times with respect to the static air permeability before abrasion test, more preferably a change rate within 1.5 times and moreover preferably a change rate within 1.3 times.

When the dynamic air permeability is measured, a dynamic air permeability curve index (Exponent) calculated from a pressure applied to a measurement sample and a curve of the dynamic air permeability, is simultaneously obtained. To use the inflator gas effectively in deploying the airbag, Exponent is preferably 1.0 to 1.8, and more preferably 1.2 to 1.6.

Herein, when a value of Exponent is 1.0, this indicates that the air permeability is constant in spite of change in internal pressure of a bag. When the value of Exponent is larger than 1.0, this indicates that the air permeability is increased with an increase in internal pressure of a bag. In contrast with this, when the value of Exponent is smaller than 1.0, this indicates that the air permeability is decreased with an increase in internal pressure of a bag. In general, the smaller the dynamic air permeability is, the larger the dynamic air permeability curve index becomes. That is, if there is a flow path through which air can pass, the flow path is expanded with an increase in internal pressure of a bag and the air permeability is increased. In deployment of the airbag, if a passenger strikes an expanded airbag, since an internal pressure of the bag increases and this increase of pressure causes an increase in air permeability, the textile having a high dynamic air permeability curve index has a larger loss of an inflator gas than the textile having a low dynamic air permeability curve index. In addition, Exponent is automatically calculated by an air permeability tester FX 3350 AIRBAG-TESTER manufactured by TEXTEST AG. described later and the calculation method is not disclosed.

In addition to this, to increase WR and FR, there is a method in which multifilament threads having low total fineness and low single fiber fineness are used and woven at a low weaving density; however, the total fineness and weaving density of the decomposition threads are set to the following range from the viewpoint of mechanical properties required for an airbag. Specifically, a preferred sum (CF) of a warp thread cover factor (WCF) and a weft thread cover factor (FCF) to adequately impart mechanical properties in deploying the airbag, is preferably 2000 to 2400, more preferably 2100 to 2350, and moreover preferably 2200 to 2300.

WCF, FCF and CF are calculated from the following formulae (3), (40 and (5).

$$WCF = (\text{Total fineness of warp threads constituting textile (dtex)})^{1/2} \times (\text{Warp thread density (number of threads/2.54 cm)}) \quad (3)$$

$$FCF = (\text{Total fineness of weft threads constituting textile (dtex)})^{1/2} \times (\text{Weft thread density (number of threads/2.54 cm)}) \quad (4)$$

$$WCF + FCF = CF \quad (5).$$

The weight per unit area of the base fabric is preferably 120 g/m$^2$ or more, further preferably 150 g/m$^2$ or more, and further preferably 170 g/m$^2$ or more from the viewpoint of the strength of the airbag. The weight per unit area is preferably 320 g/m$^2$ or less, further preferably 280 g/m$^2$ or less, and further preferably 230 g/m$^2$ or less from the viewpoint of lightweight properties.

The thickness of the base fabric is preferably 0.20 mm or more, further preferably 0.23 mm or more, and further preferably 0.28 mm or more from the viewpoint of strength and compactness in folding the airbag to be housed. The thickness is preferably 0.40 mm or less, further preferably 0.38 mm or less, and further preferably 0.34 mm or less.

From the viewpoint of workability in sewing an airbag cushion using the base fabric, or in folding the airbag cushion to be housed, bending resistance is preferably 5 N or more, further preferably 7N or more, and further preferably 9 N or more. Further, the bending stiffness is preferably 25 N or less, further preferably 21 N or less, and further preferably 19 N less.

From the viewpoint of mechanical characteristics, the tensile strength of the base fabric is preferably 2500 N/5 cm or more, and further preferably 3000 N/5 cm or more in both of the warp thread direction and the weft thread direction. Further, when an upper value is defined, the tensile strength is 5000 N/5 cm or less, and further preferably 4000 N/cm or less in both of the warp thread direction and the weft thread direction.

To adapt to mitigate stress concentration due to a cushion action in deployment of the airbag, the elongation of the base fabric is preferably 25% or more, and further preferably 30% or more in both of the warp thread direction and the weft thread direction. Further, when an upper value is defined, the elongation is 50% or less, and further preferably 45% or less.

The tear strength of the base fabric is preferably 100 N or more, and preferably 120 N or more in both of the warp thread direction and the weft thread direction to prevent the occurrence of an air permeable portion due to tear-off from a sewn portion of the cushion in deployment of the airbag. Further, when an upper value is defined, the tear strength is 400 N or less, and further preferably 300 N or less.

To further reduce the seaming slippage of the sewn portion of the cushion, the edgecomb resistance is 200 N or more, and further preferably 230 N or more in both of the warp thread direction and the weft thread direction. When an upper value is defined, the edgecomb resistance is 900 N or less, and 800 N or less.

Next, an example of a method of manufacturing an airbag base fabric will be described.

A gray fabric is obtained by undergoing a warp thread preparation step and a weaving step in turn. A width of the gray fabric is usually 1 to 3 m, and the gray fabric often has a width of about 2 m. A processing machine including at least an unwinding machine, an open soaper type scouring machine, a drier, a pin tenter and a winding machine is prepared. The obtained gray fabric is processed in turn in a step of unwinding from an unwinding machine, a step of scouring the resulting gray fabric by an open soaper type scouring machine, a step of drying the resulting gray fabric in a drier, and a step of performing heat setting of the resulting gray fabric in a pin tenter, and the resulting gray fabric is wound with a winding machine. In regions between the unwinding machine of the processing machine and an inlet of the pin tenter and between an outlet of the pin tenter and the winding machine, the processing machine is adapted to exert a tensile force of 10 to 50 kgf (98 to 490 N)/m per width of the gray fabric dried by the drier in the warp thread direction of the gray fabric. For example, in the pin tenter, for the gray fabric scoured by the scouring machine and dried by the drier, tentering is performed to be 98 to 100.5% with respect to a width of the gray fabric, and heat setting is performed at a temperature of 120 to 180° C. The gray fabric is wound with a winding machine. Thus, in the processing machine, it is necessary to bring the gray fabric into contact with at least 70 rolls per one surface of the gray fabric to process the gray fabric.

Particularly, since the weft threads are inserted into the weaving step without undergoing the warp thread preparation step, it is necessary to increase the FR in the processing step. The preferred number of rolls to attain larger FR is 85 or more, and more preferably 95 or more per one surface of the gray fabric.

Warp Thread Preparation Step

A warp thread preparation step is performed before the weaving step to parallel the warp threads used for the weaving step and wind the threads. The warp thread preparation step includes a method of winding a woven cloth beam all at once such as a single end warping machine and a sectional warping machine, and a method of winding the woven cloth beam in two stages by a beaming machine after rough-wound warping machine. Any of these methods may be employed as long as the base fabric is attained. However, the method of winding the woven cloth beam in two stages is preferred from the viewpoint of weaving properties and reduction of a thickness. As the warp threads charged into the warp thread preparation step since cost can be reduced, it is preferred that the multifilament threads having the material, the total fineness and the single fiber fineness are preferably charged on a frame of the rough-wound warping machine without sizing and without twisting.

Thereafter, to provide the warp threads with a certain stretch, it is preferred that the warp threads are paralleled and wound by a warping tensile force of 0.05 to 0.13 gf (0.05 to 0.13 cN)/dtex, and a rough-wound beam is prepared. In so doing, a wax or an additional oil solution may be provided for the warp threads to improve fluff binding or step passing properties. Thereafter, after the rough-wound beam is charged into a beaming machine to provide the warp threads with a certain stretch, it is preferred that the warp threads are paralleled and wound by a beaming tensile force of 0.08 to 0.20 gf (0.08 to 0.20 cN)/dtex, and a woven cloth beam is prepared.

On the other hand, when a sizing agent is provided in the warp thread preparation step, the weaving properties are improved. However, the sizing agent is commonly removed in the scouring step. However, when a desizing scouring machine other than the open soaper type scouring machine is selected or a scouring temperature is increased, the FR is reduced. When desizing is performed using the open soaper type scouring machine, it is desired to give consideration for selection of conditions in which the FR is increased such as selection of a scouring agent capable of eliminating a sizing agent with efficiency and selection of a sizing agent which is easily removable. To avoid the necessity of giving such consideration, it is preferred that the sizing agent is not provided.

Weaving Step

In the weaving step, a gray fabric is woven using the woven cloth beam prepared above as warp threads.

As the loom, any of looms such as a water jet loom, a rapier loom and an air jet loom, may be used. However, it is preferred to use the water jet loom in which high-speed weaving is relatively easy. As the weft threads charged into the loom, multifilament threads without twisting, as with the warp threads, are preferably used without sizing in that mechanical properties of the base fabric are the same in the warp thread direction and the weft threads direction.

To draw up single fibers in a thread bundle of the warp threads and to have stable weaving properties, the warp thread tensile force is preferably set to 0.15 to 0.50 gf (0.15 to 0.49 cN)/dtex, and more preferably set within a range of 0.20 to 0.40 gf (0.20 to 0.39 cN)/dtex. In this time, when a weaving tensile force is made equal to or larger than the tensile force provided in beaming, weaving properties are improved.

As a preferred aspect to obtain an airbag base fabric having the same mechanical properties in both of the warp thread direction and the weft thread direction, it is preferred to set a differential density between the warp thread and the weft thread to within ±2.0 threads/2.54 cm, and more preferably within ±1.0 thread/2.54 cm.

As the temple of the loom, either a ring temple grasping a selvage of the textile or a bar temple grasping a whole area of the textile may be used. However, from the viewpoint of weaving a high-density gray fabric, it is preferred to use the bar temple to enable more stable insertion of weft threads.

Scouring Step

A gray fabric obtained by passing through the warp thread preparation step and the weaving step in turn is preferably scoured while performing control to exert a tensile force of 10 to 50 kgf (98 to 490 N)/m per width of the gray fabric in the warp thread direction using an open soaper type scouring machine. Examples of the scouring machine include the following ones. A type such as SOFUSA and desizing scouring, which transfers the gray fabric through a few rolls while reducing the tensile force in the warp thread direction exerted on the gray fabric in the scouring step as far as possible, and enhances the effect of cleaning a sizing agent while causing shrinkage. A type, typified by an open soaper type, which can suppress the shrinkage in the weft thread direction of the gray fabric by transferring the gray fabric through many rolls while controlling a tensile force in the warp thread direction of the gray fabric in the scouring step. As other types, there is a type such as an immersion type shrinking tank, in which facilities cost is low, and a tensile force in the warp thread direction of the gray fabric can be freely set, but shrinkage in the weft thread direction of the gray fabric is hardly controlled since the number of rolls or baths is small.

To attain the base fabric, it is preferred to use an open soaper type scouring machine to suppress shrinkage in the weft thread direction of the gray fabric while controlling tensile force in the warp thread direction of the gray fabric. It is preferred that the tensile force in the warp thread direction is 15 to 40 kgf (147 to 392 N)/m as a tensile force per width of the gray fabric since WR and FR can be more increased. In the scouring machine, arranging the rolls to bring at least 10 rolls into contact with one side of the gray fabric is preferred since WR and FR can be increased while suppressing shrinkage of the gray fabric caused during drying.

To produce the base fabric continuously without performing winding on the way, it is preferred to dispose a processed cloth accumulator between the unwinding machine and the scouring machine and between the pin tenter and the winding machine. It is preferred to dispose an accumulator capable of exerting a constant tensile force of 10 to 50 kgf (98 to 490 N)/m and process the gray fabric at the above-mentioned tensile force since WR and FR can be more increased. Particularly, it is preferred that the tensile force is 15 to 40 kgf (147 to 392 N)/m.

Temperatures of a chemical solution in the scouring machine and water in water washing tanks are preferably set to 70° C. or lower to not strongly cause shrinkage stress of the multifilament threads. The temperature is preferably 65° C. or lower.

A lower temperature is preferably 40° C. or higher in that a scouring agent is activated, and oily agent or wax adhering to the woven thread can be efficiently removed.

Drying Step

The gray fabric having undergone the scouring step is, without being wound once, subsequently controlled so that a tensile force of 10 to 50 kgf (98 to 490 N)/m per width of the gray fabric in the warp thread direction is exerted, and dried while exerting the tensile force. The tensile force is preferably 15 to 40 kgf (147 to 392 N)/m in that WR and FR can be more increased.

As the drier, any of driers such as a hot flue drier, a suction drum drier and a non-touch drier may be used as long as the base fabric is attained. However, it is more preferred to use the hot flue drier which easily keeps a running tensile force of the gray fabric constant.

Also in the drier, to increase WR and FR, it is preferred to dry the gray fabric with the tensile force exerted on the gray fabric while performing control to exert a tensile force of 10 to 50 kgf (98 to 490 N)/m per width of the gray fabric in the warp thread direction. In the drier, arranging the rolls to bring at least 5 rolls into contact with one side of the gray fabric is preferred since WR and FR can be increased while suppressing shrinkage of the gray fabric caused during drying.

A set temperature of the drier is 80° C. or higher and further preferably 100° C. or higher, and 160° C. or lower and further preferably 140° C. or lower to avoid causing heavily shrinkage stress of the multifilament thread and dry the wet gray fabric adequately.

Heat setting Step

The gray fabric having undergone the drying step does not have to be wound once, and subjected to heat setting at a temperature of 120 to 180° C. in a state in which a tenter width is set to attain a textile width of 98 to 100.5% with respect to a width of the gray fabric dried in a pin tenter and, consequently, the gray fabric having a textile width of 98 to 100.5% with respect to a width of the gray fabric dried is formed.

The reason why the textile width is selected is that when performing heat setting of the dried gray fabric in the pin tenter, WR and FR can be increased while suppressing shrinkage of the gray fabric caused during heat setting.

Further, when the tentering rate is set to obtain a width wider than that in the above range with respect to a width of the gray fabric after drying, a load is exerted on a pin, and there is a possibility that the pin is broken or bended. Further, when the tentering rate is set to obtain a width narrower than that in the above range with respect to a width of the gray fabric after drying, and WR and FR are decreased since the gray fabric is shrunk depending on shrinkage of the gray fabric occurring during heat setting. When tentering is preferably performed at 99 to 100% with respect to a width of the gray fabric after drying to implement heat setting, this can achieve productivity and lightweight properties/thin properties simultaneously.

A heat setting temperature is preferably set to a temperature of 120 to 180° C. When the heat setting temperature is excessively high, there is a possibility that mechanical properties of the base fabric are deteriorated, and when the heat setting temperature is excessively low, there may be cases where dimensions of the base fabric after processing are not stabilized. The heat setting temperature is 140° C. or higher, and further preferably 160° C. or higher to stabilize the dimensions of the base fabric after processing.

A heat setting time is 15 seconds or more and further preferably 30 seconds or more, and 120 seconds or less and further preferably 90 seconds or less to achieve adequate dimensional stability.

Roll

As described above, the gray fabric after weaving undergoes the scouring step, the drying step and the heat setting step before the winding step. The gray fabric is transferred through rolls in these steps, and it is preferably brought into contact with 70 or more rolls per one surface of the gray fabric to increase WR and FR. Preferably, at least 140 rolls are brought into contact with the gray fabric at its both surfaces.

These rolls are preferably disposed in a region in which the tensile force exerted in the warp thread direction of the gray fabric is adjusted to 10 to 50 kgf (98 to 490 N)/m.

The roll refers to all cylindrical rolls such as a free roll, a fixed roll, a bar, a driving roll and an expander roll which are disposed in the processing machine, and brought into contact with an overall width or a part of the gray fabric, and a material may be a metal or a resin, or may be wound with tapes. When the roll is a roll which rotates such as a free roll or a driving roll, it is preferred since the tensile force exerted in the warp thread direction of the gray fabric can be made constant.

A linear pressure on the gray fabric exerted by the roll is preferably 10 N/mm or less.

By thus bringing the gray fabric into contact with 70 or more rolls per one surface, single fibers constituting the warp thread and the weft thread in the base fabric become close-packed in a direction of a horizontal plane of the base fabric. As a result of this, FR and WR are controlled, and an airbag which is lightweight and compact can be formed. The number of rolls is preferably 85 or more, and further preferably 95 or more. An upper limit is not particularly present as long as the base fabric is attained. However, the number of rolls is preferably 120 or less from the viewpoint of suppressing an investment cost of a processing machine.

Tension

In the processing step that attains the airbag base fabric, by running the gray fabric at the same tension from unwinding to winding excluding the inside of the pin tenter which cannot substantially control a tensile force, single fibers in the warp thread and the weft thread are drawn up, WR and FR can be increased and, as a result, it becomes possible to obtain an airbag base fabric which is lightweight and thin, and therefore it is preferred. In the above, as the same tension, a tension maintained at 10 to 50 kgf (98 to 490 N)/m is preferred, and a tension maintained at 15 to 40 kgf (147 to 392 N)/m is desired.

Processed Cloth Accumulation

To continuously charge a plurality of gray fabric rolls into processing and continuing processing while batching a processed gray fabric at regular lengths, an accumulator can be arranged after unwinding the gray fabric, and/or before winding to accumulate the processed cloth. Also in this case, to increase the WR and FR, it is preferred to run the gray fabric with a certain tensile force exerted on the gray fabric. In both accumulators on an unwinding side and a winding side, at least 10 rolls are preferably disposed to be brought into contact with one side of the gray fabric.

In addition to this, it is preferred to include an apparatus to run the gray fabric with a constant tensile force exerted on the gray fabric between the accumulator and the scouring machine, between the scouring machine and the drier, between the drier and the pin tenter and between the pin tenter and the accumulator. For example, when there is an air dancer, a swivel guide or the like, it is preferred since the tensile force can be easily controlled through a roll.

With respect to transfer by a roll performed in these steps, it is desired to bring one surface of the gray fabric into contact with 70 or more rolls.

The airbag base fabric can achieve such compatibility between characteristics that lightweight properties and thin properties are realized while retaining mechanical properties and low air permeability required of an airbag base fabric, which has been considered difficult. Therefore, the base fabric can improve compactness by which an interior space can be widened while having a required passenger protection function when the base fabric is formed into an airbag without coating the base fabric, and lightweight properties which improves fuel economy. Naturally, the airbag base fabric may be coated to be used as an airbag.

The airbag base fabric can be suitably used for any airbag such as an airbag for a driver's seat, an airbag for a passenger's seat, an airbag for a rear seat, an airbag for side collision, and an airbag for a pedestrian.

EXAMPLES

Hereinafter, our bases, fabrics and methods will be described in detail by way of Examples.

Measurement Method

Definitions and measurement methods of characteristics are as follows.

(1) Total Fineness: Fineness based on corrected weight was measured under a predetermined weight of 0.045 cN/dtex by a JIS L 1013:2010 8.3.1 A method, and the measured value was taken as total fineness.

(2) Crimping Rate: According to JIS L 1096:2010 8.7 B method, an initial weight was set by a calculating formula represented by formula (6), and crimping rates in the warp thread direction and the weft thread direction were calculated.

$$Cw=(L-200)/200\times100 \qquad (6)$$

wherein, Cw: crimping rate (%)
L: Length drawn straight (mm)

(3) Total Fineness of Decomposition Threads

According to JIS L 1096:2010 8.9.1.1 B method, the decomposition threads in the warp thread direction and the weft thread direction were collected from a square (25 cm×25 cm) sample cut out from the base fabric, and total fineness (dtex) of decomposition threads in the warp thread direction and the weft thread direction was calculated using the crimping rate calculated by the method described in the above (2).

(4) Single Fiber Fineness: The single fiber fineness is calculated by dividing the total fineness by the number of single fibers.

(5) Single Fiber Fineness of Decomposition Threads: The single fiber fineness of the decomposition threads is calculated by dividing the total fineness of the decomposition threads by the number of single fibers.

(6) Strength/Elongation: The strength and elongation were measured under a condition of elongation at a constant speed shown in JIS L 1013:2010 8.5.1 testing in standard. Using "TENSILON"® UCT-100 manufactured by ORIENTEC CORPORATION, the sample was gripped at a length of specimen between grips of 25 cm and measured at a tensile speed of 30 cm/min. In addition, the elongation was determined from elongation of a point showing maximum strength in a stress-strain curve.

(7) Strength of Decomposition Thread: The strength was measured applying twisting of 20 times/25 cm according to a condition of elongation at a constant speed shown in JIS L 1013:2010 8.5.1 testing in standard. As a measuring instrument, "TENSILON" UCT-100 manufactured by ORIENTEC CORPORATION was used, and measurement was performed at a tensile speed of 30 cm/min and at a length of specimen between grips of 25 cm. The resulting strength (cN) of the decomposition threads was divided by the total fineness of the decomposition threads to determine strength (cN/dtex) of the decomposition thread.

(8) Weaving Densities of Warp Thread and Weft Thread

The weaving density was measured according to JIS L 1096:2010 8.6.1 A method.

The sample was placed on a flat stand, unnatural wrinkles and tensile forces were removed, and the number of warp threads and the number of weft threads per 2.54 cm were counted without raveling the warp threads and the weft threads at each of 5 different points of the sample using FX 3250 manufactured by TEXTEST AG., and an average value of each point was calculated.

(9) Cross-Sectional Deformation

Square samples having a size of 3 cm×3 cm were cut out along the warp thread and the weft threads from 5 different points in the textile. To fix a structure of the textile, a release film of 50 g/cm² or less was cut out into a square having a size of 5 cm×5 cm by two sheets, and a commercially available woodworking adhesive was applied to two sheets of films to be 0.5 mm or less in thickness. The sample was placed gently on the adhesive applied surface of one sheet of the films, and further the other sheet of the release film provided with an adhesive was put on the sample with the surface of the applied adhesive surface facing downward. The sample was left standing at room temperature for 24 hours without applying a load. Next, the release film was peeled off. Using "FEATHER"® blade S single-edged razor blade FAS-10 manufactured by FEATHER Safety Razor Co., Ltd. as a cutting blade, an apex portion of woven threads of the warp threads and the weft threads was cut. The cross-section was photographed using a scanning electron microscope S-3400N (trade name) manufactured by HITACHI, LTD. When photographing the warp threads and the weft threads existing on a side of the surface, in which the cutting blade was inserted, of two surfaces of the textile, arrangement of the single fibers in a cross section of the textile, which was a sample, can be more closely observed than when photographing the warp threads and the weft threads existing on a side of the surface, in which the cutting blade was inserted out. The reason for this is that on a surface side which the blade is cut through out of, fibers bundled together loose or come apart by cutting through of the blade. Accordingly, as an object of observation of a bundle of filaments, the warp threads and the weft threads existing on a side of the surface in which the cutting blade was inserted were employed.

A major axis and a minor axis of each of cross sections of the warp thread and the weft thread along a plane of a cutting blade insertion (for example, in FIG. 1, lengths of line segments of a symbol 1 and a symbol 2) were measured to determine the warp thread cross-sectional deformation (WR) and the weft thread cross-sectional deformation (WF) represented by a formula (7) and a formula (8). In this measurement, a major axis/a minor axis of each of the warp thread cross sections and the weft thread cross sections of 5 points selected at random were determined, and an average of 5 points was taken as WR and as FR. In addition, the cutting blade was replaced with a new one after each cutting.

$$\text{Warp thread cross-sectional deformation } (WR) = (\text{Major axis of warp thread cross section})/(\text{Minor axis of warp thread cross section}) \quad (7)$$

$$\text{Weft thread cross-sectional deformation } (WF) = (\text{Major axis of warp thread cross section})/(\text{Minor axis of warp thread cross section}) \quad (8)$$

(10) Weight Per Unit Area

According to JIS L 1096:2010 8.3.2 A method, samples having a size of 25 cm×25 cm of 3 different points in the sample were prepared, and masses of the samples were measured using an electronic balance to calculate a mass per square meter, and an average value was defined as a weight per unit area.

(11) Thickness

According to JIS L 1096:2010 8.4 A method, thicknesses of 5 different points in the sample were measured after waiting for 10 seconds to settle the thickness under a pressure of 1.0 kPa using a thickness measuring instrument with a circular probe of 1.05 cm in diameter to calculate an average value.

(12) Tensile Strength/Elongation

According to JIS L 1096:2010 8.14 A method (strip method), sample pieces having of 6 cm wide×35 cm long of 3 different points in the sample were prepared, and adjusted to be 5 cm in width by removing threads from both sides of the width. Using "Instron"® 5965 manufactured by Instron Corp., the prepared sample was tested at a tension rate of 20 cm/min under a clamping distance of 20 cm until the sample was broken to determine stress at break, and an average value of the stress was taken as tensile strength (N/5 cm). In addition, the elongation was determined from elongation of a point showing maximum strength in a stress-strain curve.

(13) Tear Strength

According to JIS L 1096:2010 8.17 A method (single tongue method), test pieces having a size of 15 cm×20 cm of 3 different points in the sample were prepared, a cut of 10 cm was made in the center (7.5 cm) of a short side of the test piece in a direction orthogonal to the short side, cut sections (portions of 7.5 cm×10 cm) were clamped in a direction orthogonal to clamps in a vertical direction using clamps of 15 cm or more in width for "Instron" 5965 manufactured by Instron Corp., and a tear test of each of the test pieces was performed at a tension rate of 10 cm/min until the test piece was torn by 9 cm. A zone from a first maximum point of the resulting stress-strain curve to an endpoint of test was divided into 4 parts, and an average of maximum points of 3 parts (second quarter to fourth quarter) excluding the first part (first quarter) was determined, and the average was defined as tear strength (N). In addition, with respect to the maximum point, a point which changes by 10% or more from an immediately anterior concave portion with respect to an average stress of the 3 parts was defined as the maximum point and read.

(14) Edgecomb Resistance

According to ASTM D 6479-02, a test piece was taken from 5 different points in the sample, a test was carried out using "Instron" 5965 manufactured by Instron Corp., and an average value was taken as edgecomb resistance (N).

(15) Bending Stiffness

Bending stiffness was measured according to a circular bend method of ASTM D 4032-94.

(16) Static Air Permeability

According to an air permeability A method (fragile form method) prescribed by JIS L 1096:2010 8.26.1, air amounts per measurement area of 100 cm² permeating test pieces (L/dm²/min) of 6 different points in the sample under a differential pressure of 500 Pa were determined, and an average value was calculated and taken as static air permeability (L/dm²/min).

(17) Static Air Permeability after Abrasion Test

A square sample of 120 mm along the warp thread direction and 120 mm along the weft thread direction was cut out from each of 6 different points in the sample. Each sample was folded twice along the weft thread (such that the warp thread is folded) to obtain a sample of 120 mm×30 mm. According to JIS K 6404-6:1999, an abrasion test of this sample was performed 50 times such that using a SCOTT type abrasion tester, both ends of the weft thread are grasped and kneaded under conditions of a clamping distance of 30 mm, a weight of 9.8 N, a damper displacement distance of 50 mm and an abrasion speed of 120 times/min. The resulting samples after the abrasion test were measured by the same test method as in the above-mentioned paragraph (12) according to an air permeability A method (fragile form method) prescribed by JIS L 1096:2010 8.26.1, and an average value was calculated and taken as static air permeability after Abrasion test (L/dm²/min).

A value obtained by dividing the above-mentioned static air permeability after abrasion test by the static air permeability before abrasion test measured in the above-mentioned (16) was taken as a change in static air permeability after abrasion test.

(18) Average Dynamic Air Permeability/Dynamic Air Permeability Curve Index

According to ASTM D 6476-02, using an air permeability tester FX 3350 AIRBAG-TESTER manufactured by TEXTEST AG., a test head of 400 cm³ was used, a pressure of compressed air (start pressure) filled in the test head was adjusted such that the maximum pressure exerted on the textile was 100±5 kPa, the compressed air filled in the test head was released and blown on a sample of cloth, and pressure and air permeability were measured over time. Measurement was performed at 6 different points in the sample. In a pressure-dynamic air permeability curve obtained as a result of measurement, an average flow rate (mm/sec) within a range of from an upper limit: 70 kPa to a lower limit: 30 kPa after reaching the maximum pressure was determined, and an average value was taken as dynamic air permeability (mm/sec). Further, also with respect to Exponent which FX3350 automatically calculates, its average value was calculated and taken as a dynamic air permeability curve index.

Example 1

Warp Thread/Weft Thread

Synthetic fiber multifilaments without twisting which are made of nylon 6,6, have a cross-sectional shape of a circle, single fiber fineness of 6.5 dtex, number of filaments of 72, total fineness of 470 dtex, tensile strength of 8.5 cN/dtex, elongation of 23.5%, and boiling water shrinkage of 6.0% were used as the warp threads and the weft threads.

Warp Thread Preparation Step

Using a rough-wound warping machine, the warp threads were wound with a tensile force of 0.1 gf (0.1 cN)/dtex per unit fineness of the warp thread being applied to prepare a rough-wound beam. Thereafter, using a beaming machine, the rough-wound beam was paralleled with a tensile force of 0.15 gf (0.15 cN)/dtex per unit fineness of the warp thread being applied to prepare a woven cloth beam.

Weaving Step

The prepared woven cloth beam was charged into a water jet loom (WJL), and a gray fabric in which a warp thread density was 54.5 threads/2.54 cm, a weft thread density was 55 threads/2.54 cm and a width was 2.0 mm, was woven using the above-mentioned weft threads.

A bar temple was disposed between a beating part and a friction roller, and a tensile force of 0.42 gf (0.41 cN)/dtex per unit fineness of the warp thread was exerted on the gray fabric, and the number of revolutions of a loom was set to 600 rpm.

Processing Step

The gray fabric was set on an unwinding machine. The gray fabric was unwound and made to pass through an accumulator having 10 rolls which rotate and 5 rolls which do not rotate per one surface of the gray fabric. Moreover, the gray fabric was made to pass through an open soaper type scouring machine having 25 rolls which rotate and 7 rolls which do not rotate per one surface of the gray fabric to be scoured. With respect to scouring conditions, a water temperature of a scouring tank was set at 65° C. and a water temperature of a hot-water washing tank was set at 40° C. The scoured gray fabric was subsequently made to pass through a hot-air type drier having 10 rolls which rotate and 2 rolls which do not rotate per one surface of the gray fabric in which a drying temperature was 120° C. Subsequently, the gray fabric was made to pass through a pin tenter drier. A tentering rate was set to be the same as a width of the gray fabric after drying, and the gray fabric was subjected to heat setting processing at 180° C. for 60 seconds under dimensional regulation of an overfeed rate of 0%. The gray fabric was further made to pass through an accumulator having 8 rolls which rotate and 3 rolls which do not rotate per one surface of the gray fabric. The gray fabric was further wound to obtain an airbag base fabric.

A tensile force of the gray fabric was adjusted so that a tensile force of 30 kgf (294 N)/m was exerted in the warp thread direction on the gray fabric in a range from the accumulator after unwinding to inside of the drier, and in the accumulator after heat setting, and the gray fabric was processed while bringing the gray fabric into contact with a total of 83 rolls which rotate and 17 rolls which do not rotate per one surface of the gray fabric combined with rolls disposed between the accumulator and the scouring machine or the like.

The resulting airbag base fabric retained good mechanical properties, as shown in Table 1, and had a large cross-sectional deformation even though being a high-density textile using threads having a circular cross section and, consequently, the airbag base fabric was lightweight and thin and had low air permeability.

Example 2

Warp Thread/Weft Thread

The warp threads and the weft threads of Example 1 were used.

Warp Thread Preparation Step

A woven cloth beam was prepared in the same manner as in Example 1.

Weaving Step

A gray fabric was woven in the same manner as in Example 1.

Processing Step

The gray fabric was processed in the same manner as in Example 1 except for using a processing machine composed of an accumulator having 10 rolls which rotate per one surface of the gray fabric, an open soaper type scouring machine having 18 rolls which rotate and 2 rolls which do not rotate, a hot-air type drier having 8 rolls which rotate and an accumulator having 8 rolls, and bringing the gray fabric into contact with a combined total of 70 rolls which rotate and 4 rolls which do not rotate per one surface of the gray fabric with rolls disposed between the accumulator and the scouring machine or the like.

The resulting airbag base fabric retained good mechanical properties, as shown in Table 1, and had a large cross-sectional deformation even though being a high-density textile using threads having a circular cross section, and consequently the airbag base fabric was lightweight and thin and had low air permeability.

Example 3

Warp Thread/Weft Thread

Synthetic fiber multifilaments without twisting which are made of nylon 6,6, have a cross-sectional shape of a circle, single fiber fineness of 3.5 dtex, number of filaments of 136, total fineness of 470 dtex, tensile strength of 8.5 cN/dtex, elongation of 23.5%, and boiling water shrinkage of 6.5% were used as the warp threads and the weft threads.

Warp Thread Preparation Step

A woven cloth beam was prepared in the same manner as in Example 1.

Weaving Step

A gray fabric was woven in the same manner as in Example 1 except for changing the warp thread density to 54.0 threads/2.54 cm.

Processing Step

An airbag base fabric was obtained in the same processing manner as in Example 1.

The resulting airbag base fabric retained good mechanical properties, as shown in Table 1, and had a large cross-sectional deformation even though being a high-density textile using threads having a circular cross section, and consequently the airbag base fabric was lightweight and thin and had low air permeability.

Comparative Example 1

Warp Thread/Weft Thread

Synthetic fiber multifilaments without twisting which are made of nylon 6,6, have a cross-sectional shape of a circle, single fiber fineness of 3.5 dtex, number of filaments of 136, total fineness of 470 dtex, tensile strength of 8.5 cN/dtex, elongation of 23.0%, and boiling water shrinkage of 7.2% were used as the warp threads and the weft threads.

Warp Thread Preparation Step

A woven cloth beam was prepared in the same manner as in Example 1.

Weaving Step

A gray fabric was woven in the same manner as in Example 1.

Processing Step

Using a pin tenter drier not including an accumulator, a scouring machine and a drier for both after unwinding and before winding, a tentering rate was set to be the same as a width of the gray fabric, and the gray fabric was subjected to heat setting processing at 180° C. for 30 seconds under dimensional regulation of an overfeed rate of 0%. In addition, in this processing machine, a total of 15 rolls which rotate and 3 rolls which do not rotate per one surface of the gray fabric were disposed to connect the unwinding machine to the pin tenter drier, and the pin tenter drier to the winding machine, and the gray fabric was wound without controlling a tensile force of the gray fabric to obtain an airbag base fabric.

The resulting airbag base fabric retained good mechanical properties, as shown in Table 1, but had a small cross-sectional deformation of the weft threads since the number of rolls with which the gray fabric was brought into contact in the processing step was small and, consequently, the airbag base fabric was heavyweight and thick and had high air permeability compared with Example 3.

Comparative Example 2

Warp Thread/Weft Thread

Synthetic fiber multifilaments without twisting which are made of nylon 6,6, have a cross-sectional shape of a circle, single fiber fineness of 6.5 dtex, number of filaments of 72, total fineness of 470 dtex, tensile strength of 8.0 cN/dtex, elongation of 21.0%, and boiling water shrinkage of 6.9% were used as the warp threads and the weft threads.

Warp Thread Preparation Step

A woven cloth beam was prepared in the same manner as in Example 1 except for providing the warp threads with a sizing agent using a beaming machine for sizing. In the rough-wound warping steps, the warp threads were wound with a tensile force of 0.1 gf (0.1 cN)/dtex per unit fineness of the warp thread being applied, and in the beaming for sizing, the warp threads were wound with a tensile force of 0.13 gf (0.13 cN)/dtex per unit fineness of the warp thread being applied.

Weaving Step

The prepared woven cloth beam was charged into a rapier loom, and a gray fabric in which a warp thread density was 54 threads/2.54 cm, a weft thread density was 53 threads/2.54 cm and a width was 2.0 mm, was woven using the above-mentioned weft threads.

A bar temple was disposed between a beating part and a friction roller, and a tensile force of 0.32 gf (0.31 cN)/dtex per unit fineness of the warp thread was exerted on the gray fabric, and the number of revolutions of a loom was set to 450 rpm.

Processing Step

The gray fabric was unwound, underwent an accumulator, and was scoured in a pre-wet tank of normal temperature, a desizing scouring tank of 80° C., and a hot-water washing tank of 80° C. using a desizing scouring machine. Subsequently, the gray fabric was dried at a drying temperature of 120° C. using a hot-air type drier, subsequently, a tentering rate was set to be the same as a width of the gray fabric after drying using a pin tenter drier, and the gray fabric was subjected to heat setting processing at 180° C. for 1 minute under dimensional regulation of an overfeed rate of 0%. Moreover, the gray fabric was wound through an accumulator to obtain an airbag base fabric.

A tensile force of the gray fabric was adjusted so that a tensile force of 20 kgf (196 N)/m was exerted in the warp thread direction on the gray fabric in the accumulator after unwinding, within the drier, and within the accumulator after heat setting, and the gray fabric was processed while bringing the gray fabric into contact with 79 rolls which rotate and 20 rolls which do not rotate per one surface of the gray fabric. The gray fabric in a range of from a pre-wet tank to a water washing tank was brought into contact with 33 rolls which rotate and 7 rolls which do not rotate per one side of the gray fabric while exerting a running tensile force of 5 kgf (49 N)/m per width of the gray fabric on the gray fabric to increase permeation of liquid into a textile to remove the sizing agent.

The resulting airbag base fabric, as shown in Table 1, had small cross-sectional deformations of both of the warp threads and weft threads probably because of shrinkage in the processing step, and consequently the airbag base fabric was heavyweight and thick and had high air permeability compared to Examples 1 and 2.

Comparative Example 3

Warp Thread/Weft Thread

The warp threads and the weft threads of Example 1 were used.

Warp Thread Preparation Step

A woven cloth beam was prepared in the same manner as in Example 1.

Weaving Step

A gray fabric was woven in the same manner as in Example 1.

Processing Step

An airbag base fabric was obtained in the same processing manner as in Example 2 except for setting the tentering rate to be 96% in width with respect to a width of the gray fabric after drying.

The resulting airbag base fabric, as shown in Table 1, had a small cross-sectional deformation of the weft threads probably because of shrinkage in the tenter, and consequently the airbag base fabric was heavyweight and thick and had high air permeability compared to Examples 1 and 2.

Comparative Example 4

Warp Thread/Weft Thread

The warp threads and the weft threads of Example 1 were used.

Warp Thread Preparation Step

A woven cloth beam was prepared in the same manner as in Example 1.

Weaving Step

A gray fabric was woven in the same manner as in Example 1.
Processing Step

The gray fabric was processed in the same manner as in Example 1 except for using a processing machine composed of an accumulator having 10 rolls which rotate per one surface of the gray fabric, an open soaper type scouring machine having 8 rolls which rotate and 2 rolls which do not rotate, a hot-air type drier having 8 rolls which rotate and an accumulator having 7 rolls, and having a combined total of 55 rolls which rotate and 5 rolls which do not rotate per one surface of the gray fabric with rolls disposed between the accumulator and the scouring machine.

The resulting airbag base fabric, as shown in Table 2, had a small cross-sectional deformation of the weft threads since drawing up of single fibers of the weft thread localized at the base fabric surface was inadequate. Consequently, the airbag base fabric had high air permeability compared to Examples 1 and 2.

Example 4

Warp Thread/Weft Thread

The warp threads and the weft threads of Example 3 were used.
Warp Thread Preparation Step A woven cloth beam was prepared in the same manner as in Example 1.
Weaving Step A gray fabric was woven in the same manner as in Example 1 except for changing the warp thread density to 52.5 threads/2.54 cm and changing the weft thread density to 53 threads/2.54 cm.
Processing Step An airbag base fabric was obtained in the same processing manner as in Example 1 except for changing the tenter temperature to 160° C.

The resulting airbag base fabric retained required mechanical properties, as shown in Table 2, and had a large cross-sectional deformation even though being a high-density textile using threads having a circular cross section, and the airbag base fabric was lightweight and thin and had low air permeability.

Comparative Example 5

Warp Thread/Weft Thread

Synthetic fiber multifilaments without twisting which are made of nylon 6,6, have a cross-sectional shape of a circle, single fiber fineness of 3.3 dtex, number of filaments of 144, total fineness of 470 dtex, tensile strength of 8.5 cN/dtex, elongation of 23.5%, and boiling water shrinkage of 7.9% were used as the warp threads and the weft threads.
Warp Thread Preparation Step A woven cloth beam was prepared in the same manner as in Example 1.
Weaving Step A gray fabric was woven in the same manner as in Example 1 except for changing the warp thread density to 50 threads/2.54 cm and changing the weft thread density to 50 threads/2.54 cm.
Processing Step The gray fabric was immersed in hot water of 95° C. using an immersion type shrinking tank not including an accumulator in place of an open soaper type scouring machine to perform shrinking, and then the gray fabric was dried/finished at 130° C. by a hot-air drier, and processed while bringing the gray fabric into contact with 15 rolls which rotate per one surface to prepare an airbag base fabric.

The processing machine was adjusted to exert a tensile force of 40 kgf (392 N)/m per width on the gray fabric during shrinking and in the drier.

The obtained airbag base fabric used multifilament threads having the same total fineness as that of the airbag base fabric of Example 4 and had the same weaving density after processing as that of Example 4. However, since shrinking was performed and the number of rolls through which the gray fabric were made to pass was small, as shown in Table 2, although the base fabric retained good mechanical properties and low air permeability, arrangement of the single fibers was disordered and the cross-sectional deformation in the warp thread direction was small in spite of the single fiber fineness smaller than that of Example 4. Moreover, the airbag base fabric was heavyweight and thick compared with Example 4 since the total fineness of the decomposition threads became larger than the total fineness of the multifilaments before weaving by shrinking processing.

Example 5

Warp Thread/Weft Thread

The warp threads and the weft threads of Example 3 were used.
Warp Thread Preparation Step A woven cloth beam was prepared in the same manner as in Example 1.
Weaving Step A gray fabric was woven in the same manner as in Example 1 except for changing the warp thread density to 50 threads/2.54 cm and changing the weft thread density to 50 threads/2.54 cm.
Processing Step An airbag base fabric was obtained in the same processing manner as in Example 1 except for changing the tenter set temperature to 120° C.

The resulting airbag base fabric was composed of threads having a circular cross section while retaining good mechanical properties, as shown in Table 2, and had a large cross-sectional deformation even though being a high-density textile and, consequently, the airbag base fabric was lightweight and thin and had low air permeability.

Comparative Example 6

Warp Thread/Weft Thread

Synthetic fiber multifilaments without twisting which are made of nylon 6,6, have a single fiber cross-sectional flatness of 3.3, single fiber fineness of 4.9 dtex, number of filaments of 96, total fineness of 470 dtex, tensile strength of 7.9 cN/dtex, elongation of 24.5%, and boiling water shrinkage of 6.2% were used as the warp threads and the weft threads.
Warp Thread Preparation Step A woven cloth beam was prepared in the same manner as in Example 4.
Weaving Step A gray fabric was woven in the same manner as in Example 4 except for changing the tensile force per unit fineness of the warp thread to 0.2 gf (0.2 cN)/dtex.

Processing Step

An airbag base fabric was obtained in the same processing manner as in Example 1.

The resulting airbag base fabric had a large cross-sectional deformation, and was lightweight and thin since it used threads having a flat cross section as characteristics of a multifilament thread, a decomposition thread and a base fabric and production conditions of base fabric shown in Table 2. However, it had a large change rate in static air permeability since single fiber arrangement was disordered after Abrasion test, and could not achieve retaining of low air permeability.

Example 6

Warp Thread/Weft Thread

Synthetic fiber multifilaments without twisting which are made of nylon 6,6, have a cross-sectional shape of a circle, single fiber fineness of 2.6 dtex, number of filaments of 136, total fineness of 350 dtex, tensile strength of 8.5 cN/dtex, elongation of 23.5%, and boiling water shrinkage of 6.5% were used as the warp threads and the weft threads.

Warp Thread Preparation Step

A woven cloth beam was prepared in the same manner as in Example 1.

Weaving Step

A gray fabric was woven in the same manner as in Example 1 except for changing the warp thread density to 59.5 threads/2.54 cm, changing the weft thread density to 60 threads/2.54 cm, and changing the tensile force per unit fineness of the warp thread to 0.18 gf (0.18 cN)/dtex.

Processing Step

An airbag base fabric was obtained in the same processing manner as in Example 1 except for changing the tenter set temperature to 160° C.

The resulting airbag base fabric was composed of threads having a circular cross section while retaining good mechanical properties as shown in Table 2, and had a large cross-sectional deformation even though being a high-density textile and, consequently, the airbag base fabric was lightweight and thin and had low air permeability.

Example 7

An airbag base fabric was obtained in the same manner as in Example 6 except that strength and elongation of the synthetic fiber multifilament threads to be used for the warp threads and the weft threads were changed to 9.2 cN/dtex and 22.8%, respectively.

The resulting airbag base fabric was composed of threads having a circular cross section while retaining good mechanical properties as shown in Table 3, and had a large cross-sectional deformation even though being a high-density textile, and consequently the airbag base fabric was lightweight and thin and had low air permeability.

Example 8

Warp Thread/Weft Thread

The same synthetic fiber multifilaments without twisting as those of Example 6 were used except that the number of filaments was changed to 108 and the total fineness was changed to 350 dtex.

Warp Thread Preparation Step

A woven cloth beam was prepared in the same manner as in Example 1.

Weaving Step

A gray fabric was woven in the same manner as in Example 6 except for changing the warp thread density to 57.5 threads/2.54 cm and changing the weft thread density to 58 threads/2.54 cm.

Processing Step

An airbag base fabric was obtained in the same processing manner as in Example 6.

The resulting airbag base fabric was composed of threads having a circular cross section while retaining good mechanical properties, as shown in Table 3, and had a large cross-sectional deformation even though being a high-density textile and, consequently, the airbag base fabric was lightweight and thin and had low air permeability.

Example 9

Warp Thread/Weft Thread

The warp threads and the weft threads of Example 1 were used.

Warp Thread Preparation Step

A woven cloth beam was prepared using a partial warping machine.

Weaving Step

A gray fabric was woven in the same manner as in Example 1.

Processing Step

A gray fabric was processed in the same manner as in Example 2.

The resulting airbag base fabric was composed of threads having a circular cross section while retaining good mechanical properties, as shown in Table 3, and had a large cross-sectional deformation even though being a high-density textile and, consequently, the airbag base fabric was lightweight and thin and had low air permeability.

Comparative Example 7

The gray fabric prepared by the method of Example 1 was made to pass through a hot-air type drier having 10 rolls which rotate and 2 rolls which do not rotate per one surface of the gray fabric to be dried at a drying temperature of 120° C., and then subjected to calendering.

The resulting airbag base fabric, as shown in Table 3, had a large cross-sectional deformation, and was lightweight and thin. However, it had low decomposition thread strength and low mechanical properties of the base fabric since a cross-sectional shape of the single fiber was deformed due to a pressure of press during calendering.

TABLE 1

|  |  | Example 1 | Example 2 | Example 3 | Comparative Example 1 | Comparative Example 2 | Comparative Example 3 |
| --- | --- | --- | --- | --- | --- | --- | --- |
| Multifilament Thread | Total Fineness (dtex) | 470 | 470 | 470 | 470 | 470 | 470 |
|  | Number of Filaments | 72 | 72 | 136 | 136 | 72 | 72 |
|  | Single Fiber Fineness (dtex) | 6.5 | 6.5 | 3.5 | 3.5 | 6.5 | 6.5 |
|  | Chopped Fiber Cross-Sectional Shape | circle | circle | circle | circle | circle | circle |

TABLE 1-continued

|  |  |  |  | Example 1 | Example 2 | Example 3 | Comparative Example 1 | Comparative Example 2 | Comparative Example 3 |
|---|---|---|---|---|---|---|---|---|---|
| Production Conditions of Base Fabric | Warp Thread Preparation Step | Thread Tensile Strength (cN/dtex) | | 8.5 | 8.5 | 8.5 | 8.5 | 8.0 | 8.5 |
|  |  | Boiling Water Shrinkage (%) | | 6.0 | 6.0 | 6.5 | 7.2 | 6.9 | 6.0 |
|  |  | Number of Steps* | | 2 | 2 | 2 | 2 | 2 | 2 |
|  |  | Sizing | | none | none | none | none | present | none |
|  | Weaving Step | Loom | | WJL | WJL | WJL | WJL | rapier | WJL |
|  |  | Weaving Tension (g/dtex) | | 0.42 | 0.42 | 0.42 | 0.42 | 0.32 | 0.42 |
|  |  | Gray Fabric Width (m) | | 2.0 | 2.0 | 2.0 | 2.0 | 2.0 | 2.0 |
|  | Processing Step | Tension between Unwinding-Scouring (kgf/m) | | 30 | 30 | 30 | — | 20 | 30 |
|  |  | Scouring Machine Type | | open soaper | open soaper | open soaper | — | desizing scouring machine | open soaper |
|  |  | Scouring Temperature (° C.) | | 65 | 65 | 65 | — | 80 | 65 |
|  |  | Water Washing Temperature (° C.) | | 40 | 40 | 40 | — | 80 | 40 |
|  |  | Tension within Scouring Step (kgf/m) | | 30 | 30 | 30 | — | 5 | 30 |
|  |  | Tension within drying Step (kgf/m) | | 30 | 30 | 30 | — | 20 | 30 |
|  |  | Drying Temperature (° C.) | | 120 | 120 | 120 | — | 120 | 120 |
|  |  | Tenter Type | | pin tenter | pin tenter | pin tenter | pin tenter | pin tenter | pin tenter |
|  |  | Tentering Rate for Gray Fabric after Drying (%) | | 100 | 100 | 100 | 100 | 100 | 96 |
|  |  | Over Feed Rate (%) | | 0 | 0 | 0 | 0 | 0 | 0 |
|  |  | Heat Setting Temperature (° C.) | | 180 | 180 | 180 | 180 | 180 | 180 |
|  |  | Tension between Thermal Setting-Winding (kgf/m) | | 30 | 30 | 30 | — | 20 | 30 |
|  |  | Number of Rolls Rotating | | 83 | 70 | 83 | 15 | 79 | 70 |
|  |  | Number of Rolls Not Rotating | | 17 | 4 | 17 | 3 | 20 | 4 |
|  |  | Total Number of Rolls | | 100 | 74 | 100 | 18 | 99 | 74 |
|  |  | Other Processing Steps | | none | none | none | none | none | none |
| Decomposition Thread | | Total Fineness (dtex) | warp | 469 | 469 | 470 | 470 | 486 | 469 |
|  |  |  | weft | 472 | 472 | 473 | 470 | 481 | 479 |
|  |  | Single Fiber Fineness (dtex) | warp | 6.5 | 6.5 | 3.5 | 3.5 | 6.8 | 6.5 |
|  |  |  | weft | 6.6 | 6.6 | 3.5 | 3.5 | 6.7 | 6.7 |
|  |  | Tensile Strength (cN/dtex) | warp | 7.2 | 7.2 | 7.0 | 6.9 | 6.8 | 7.3 |
|  |  |  | weft | 7.4 | 7.4 | 7.2 | 7.1 | 7.0 | 6.8 |
| Base Fabric | | Weaving Density (number of threads/in) | warp | 55 | 55 | 55 | 55 | 56 | 56 |
|  |  |  | weft | 55 | 55 | 55 | 55 | 54 | 55 |
|  |  | Single Fiber Cross-Sectional Shape | | substantially circle | substantially circle | substantially circle | substantially circle | substantially circle | substantially circle |
|  |  | WCF | | 1130 | 1130 | 1131 | 1131 | 1171 | 1151 |
|  |  | FCF | | 1134 | 1134 | 1135 | 1131 | 1124 | 1142 |
|  |  | CF | | 2264 | 2264 | 2266 | 2262 | 2295 | 2292 |
|  |  | WR | | 4.5 | 4.2 | 4.6 | 4.0 | 3.4 | 4.0 |
|  |  | FR | | 2.7 | 2.5 | 2.8 | 2.2 | 2.1 | 2.2 |
|  |  | Weight per Unit Area (g/m$^2$) | | 215 | 216 | 228 | 240 | 241 | 238 |
|  |  | Thickness (mm) | | 0.32 | 0.33 | 0.33 | 0.35 | 0.38 | 0.35 |
|  |  | Tensile Strength (N/5 cm) | warp | 3777 | 3797 | 3771 | 3733 | 3791 | 3819 |
|  |  |  | weft | 3787 | 3751 | 3850 | 3741 | 3691 | 3651 |
|  |  | Elongation (%) | warp | 44 | 45 | 42 | 46 | 48 | 45 |
|  |  |  | weft | 33 | 33 | 33 | 34 | 42 | 37 |
|  |  | Tear Strength (N) | warp | 188 | 191 | 188 | 191 | 227 | 172 |
|  |  |  | weft | 195 | 201 | 210 | 200 | 211 | 188 |
|  |  | Edgecomb Resistance (N) | warp | 553 | 519 | 662 | 666 | 442 | 619 |
|  |  |  | weft | 469 | 455 | 559 | 502 | 404 | 528 |
|  |  | Bending Stiffness (N) | warp | 17.0 | 16.8 | 17.1 | 19.8 | 23.2 | 19.8 |
|  |  |  | weft | 17.1 | 17.0 | 18.8 | 20.1 | 22.9 | 18.8 |
|  |  | Static Air Permeability (L/dm$^2$/min) | | 2.75 | 2.91 | 0.64 | 0.88 | 3.01 | 3.00 |
|  |  | Static Air Permeability After abrasion test (L/dm2/min) | | 2.92 | 3.00 | 0.67 | 0.92 | 3.19 | 3.19 |
|  |  | Change in Static Air Permeability After abrasion test | | 1.06 | 1.03 | 1.05 | 1.05 | 1.06 | 1.06 |
|  |  | Dynamic Air Permeability (mm/sec) | | 645 | 658 | 238 | 268 | 744 | 681 |
|  |  | Exponent | | 1.33 | 1.32 | 1.51 | 1.45 | 1.25 | 1.28 |

TABLE 2

|  |  |  | Comparative Example 4 | Example 4 | Comparative Example 5 | Example 5 | Comparative Example 6 | Example 6 |
|---|---|---|---|---|---|---|---|---|
| Multifilament Thread | Total Fineness (dtex) | | 470 | 470 | 470 | 470 | 470 | 350 |
| | Number of Filaments | | 72 | 136 | 144 | 136 | 96 | 136 |
| | Single Fiber Fineness (dtex) | | 6.5 | 3.5 | 3.3 | 3.5 | 4.9 | 2.6 |
| | Chopped Fiber Cross-Sectional Shape | | circle | circle | circle | circle | flat shape | circle |
| | Thread Tensile Strength (cN/dtex) | | 8.5 | 8.5 | 8.5 | 8.5 | 7.9 | 8.5 |
| | Boiling Water Shrinkage (%) | | 6.0 | 6.5 | 7.9 | 6.5 | 6.2 | 6.5 |
| Production Conditions of Base Fabric | Warp Thread Preparation Step | Number of Steps | 2 | 2 | 2 | 2 | 2 | 2 |
| | | Sizing | none | none | none | none | none | none |
| | Weaving Step | Loom | WJL | WJL | WJL | WJL | WJL | WJL |
| | | Weaving Tension (g/dtex) | 0.42 | 0.42 | 0.42 | 0.42 | 0.20 | 0.18 |
| | | Gray Fabric Width (m) | 2.0 | 2.0 | 2.0 | 2.0 | 2.0 | 2.0 |
| | Processing Step | Tension between Unwinding-Scouring (kgf/m) | 30 | 30 | — | 30 | 30 | 30 |
| | | Scouring Machine Type | open soaper | open soaper | shrinking tank | open soaper | open soaper | open soaper |
| | | Scouring Temperature (° C.) | 65 | 65 | — | 65 | 65 | 65 |
| | | Water Washing Temperature (° C.) | 40 | 40 | 95 | 40 | 40 | 40 |
| | | Tension within Scouring Step (kgf/m) | 30 | 30 | 40 | 30 | 30 | 30 |
| | | Tension within drying Step (kgf/m) | 30 | 30 | 40 | 30 | 30 | 30 |
| | | Drying Temperature (° C.) | 120 | 120 | 130 | 120 | 120 | 120 |
| | | Tenter Type | pin tenter | pin tenter | — | pin tenter | pin tenter | pin tenter |
| | | Tentering Rate for Gray Fabric after Drying (%) | 100 | 100 | — | 100 | 100 | 100 |
| | | Over Feed Rate (%) | 0 | 0 | — | 0 | 0 | 0 |
| | | Heat Setting Temperature (° C.) | 180 | 160 | — | 120 | 180 | 160 |
| | | Tension between Thermal Setting-Winding (kgf/m) | 30 | 30 | — | 30 | 30 | 30 |
| | | Number of Rolls Rotating | 55 | 83 | 15 | 83 | 83 | 83 |
| | | Number of Rolls Not Rotating | 5 | 17 | 0 | 17 | 17 | 17 |
| | | Total Number of Rolls | 60 | 100 | 15 | 100 | 100 | 100 |
| | | Other Processing Steps | none | none | none | none | none | none |
| Decomposition Thread | Total Fineness (dtex) | warp | 469 | 470 | 492 | 470 | 470 | 350 |
| | | weft | 472 | 473 | 485 | 473 | 472 | 352 |
| | Single Fiber Fineness (dtex) | warp | 6.5 | 3.5 | 3.4 | 3.5 | 4.9 | 2.6 |
| | | weft | 6.6 | 3.5 | 3.4 | 3.5 | 4.9 | 2.6 |
| | Tensile Strength (cN/dtex) | warp | 7.2 | 6.8 | 6.2 | 6.8 | 6.2 | 7.4 |
| | | weft | 7.4 | 7.0 | 6.2 | 7.1 | 6.3 | 7.4 |
| Base Fabric | Weaving Density (number of threads/in) | warp | 55 | 53 | 53 | 49 | 49 | 60 |
| | | weft | 55 | 53 | 53 | 49 | 49 | 60 |
| | Single Fiber Cross-Sectional Shape | | substantially circle | substantially circle | substantially circle | substantially circle | flat shape | substantially circle |
| | WCF | | 1130 | 1090 | 1115 | 1008 | 1008 | 1065 |
| | FCF | | 1134 | 1094 | 1107 | 1011 | 1010 | 1068 |
| | CF | | 2264 | 2184 | 2223 | 2019 | 2018 | 2133 |
| | WR | | 4.2 | 4.8 | 3.8 | 5.3 | 4.6 | 4.5 |
| | FR | | 2.3 | 2.9 | 2.4 | 3.3 | 4.0 | 2.7 |
| | Weight per Unit Area (g/m$^2$) | | 217 | 213 | 230 | 198 | 202 | 181 |
| | Thickness (mm) | | 0.33 | 0.31 | 0.33 | 0.30 | 0.26 | 0.27 |
| | Tensile Strength (N/5 cm) | warp | 3719 | 3618 | 3588 | 3366 | 2984 | 3210 |
| | | weft | 3751 | 3743 | 3590 | 3572 | 3091 | 3452 |
| | Elongation (%) | warp | 45 | 41 | 47 | 38 | 33 | 42 |
| | | weft | 35 | 32 | 38 | 32 | 29 | 34 |
| | Tear Strength (N) | warp | 179 | 200 | 201 | 189 | 218 | 147 |
| | | weft | 192 | 229 | 220 | 190 | 208 | 160 |
| | Edgecomb Resistance (N) | warp | 570 | 642 | 650 | 440 | 190 | 677 |
| | | weft | 482 | 493 | 511 | 372 | 180 | 546 |
| | Bending Stiffness (N) | warp | 17.8 | 17.5 | 19.2 | 10.8 | 5.3 | 11.5 |
| | | weft | 18.0 | 18.1 | 18.8 | 9.8 | 7.9 | 10.1 |
| | Static Air Permeability (L/dm$^2$/min) | | 2.95 | 1.58 | 1.02 | 1.96 | 2.10 | 2.24 |
| | Static Air Permeability After abrasion test (L/dm2/min) | | 3.05 | 2.03 | 1.33 | 3.14 | 5.50 | 3.14 |
| | Change in Static Air Permeability After abrasion test | | 1.03 | 1.28 | 1.30 | 1.61 | 2.62 | 1.40 |
| | Dynamic Air Permeability (mm/sec) | | 663 | 289 | 268 | 355 | 604 | 458 |
| | Exponent | | 1.30 | 1.32 | 1.39 | 1.27 | 1.17 | 1.29 |

TABLE 3

|  |  |  | Example 7 | Example 8 | Example 9 | Comparative Example 7 |
|---|---|---|---|---|---|---|
| Multifilament Thread | Total Fineness (dtex) | | 350 | 350 | 470 | 470 |
| | Number of Filaments | | 136 | 108 | 72 | 72 |
| | Single Fiber Fineness (dtex) | | 2.6 | 3.2 | 6.5 | 6.5 |
| | Chopped Fiber Cross-Sectional Shape | | circle | circle | circle | circle |
| | Thread Tensile Strength (cN/dtex) | | 9.2 | 8.5 | 8.5 | 8.5 |
| | Boiling Water Shrinkage (%) | | 6.5 | 6.5 | 6.0 | 6.0 |
| Production Conditions of Base Fabric | Warp Thread Preparation Step | Number of Steps | 2 | 2 | 1 (partial warping) | 2 |
| | | Sizing | none | none | none | none |
| | Weaving Step | Loom | WJL | WJL | WJL | WJL |
| | | Weaving Tension (g/dtex) | 0.18 | 0.18 | 0.42 | 0.42 |
| | | Gray Fabric Width (m) | 2.0 | 2.0 | 2.0 | 2.0 |
| | Processing Step | Tension between Unwinding-Scouring (kgf/m) | 30 | 30 | 30 | 30 |
| | | Scouring Machine Type | open soaper | open soaper | open soaper | open soaper |
| | | Scouring Temperature (° C.) | 65 | 65 | 65 | 65 |
| | | Water Washing Temperature (° C.) | 40 | 40 | 40 | 40 |
| | | Tension within Scouring Step (kgf/m) | 30 | 30 | 30 | 30 |
| | | Tension within drying Step (kgf/m) | 30 | 30 | 30 | 30 |
| | | Drying Temperature (° C.) | 120 | 120 | 120 | 120 |
| | | Tenter Type | pin tenter | pin tenter | pin tenter | pin tenter |
| | | Tentering Rate for Gray Fabric after Drying (%) | 100 | 100 | 100 | 100 |
| | | Over Feed Rate (%) | 0 | 0 | 0 | 0 |
| | | Heat Setting Temperature (° C.) | 160 | 160 | 180 | 180 |
| | | Tension between Thermal Setting-Winding (kgf/m) | 30 | 30 | 30 | 30 |
| | | Number of Rolls Rotating | 83 | 83 | 70 | 83 |
| | | Number of Rolls Not Rotating | 17 | 17 | 4 | 17 |
| | | Total Number of Rolls | 100 | 100 | 74 | 100 |
| | | Other Processing Steps | none | none | none | calender |
| Decomposition Thread | Total Fineness (dtex) | warp | 350 | 350 | 469 | 459 |
| | | weft | 352 | 352 | 472 | 457 |
| | Single Fiber Fineness (dtex) | warp | 2.6 | 3.2 | 6.5 | 6.4 |
| | | weft | 2.6 | 3.3 | 6.6 | 6.3 |
| | Tensile Strength (cN/dtex) | warp | 8.2 | 7.5 | 7.2 | 6.0 |
| | | weft | 8.3 | 7.7 | 7.4 | 6.1 |
| Base Fabric | Weaving Density (number of threads/in) | warp | 60 | 58 | 55 | 54 |
| | | weft | 60 | 58 | 55 | 54 |
| | Single Fiber Cross-Sectional Shape | | substantially circle | substantially circle | substantially circle | polygon |
| | WCF | | 1065 | 1029 | 1130 | 1098 |
| | FCF | | 1068 | 1032 | 1134 | 1095 |
| | CF | | 2133 | 2062 | 2264 | 2193 |
| | WR | | 4.5 | 4.7 | 4.1 | 5.5 |
| | FR | | 2.7 | 2.8 | 2.5 | 4.0 |
| | Weight per Unit Area (g/m$^2$) | | 181 | 170 | 217 | 210 |
| | Thickness (mm) | | 0.27 | 0.26 | 0.33 | 0.29 |
| | Tensile Strength (N/5 cm) | warp | 3521 | 3104 | 3795 | 3201 |
| | | weft | 3707 | 3314 | 3753 | 3300 |
| | Elongation (%) | warp | 41 | 40 | 45 | 31 |
| | | weft | 33 | 34 | 33 | 26 |
| | Tear Strength (N) | warp | 162 | 177 | 203 | 118 |
| | | weft | 176 | 178 | 209 | 121 |
| | Edgecomb Resistance (N) | warp | 679 | 421 | 501 | 320 |
| | | weft | 551 | 388 | 433 | 291 |
| | Bending Stiffness (N) | warp | 11.4 | 9.7 | 16.5 | 25.1 |
| | | weft | 10.6 | 9.2 | 16.8 | 23.8 |
| | Static Air Permeability (L/dm$^2$/min) | | 2.22 | 3.04 | 3.01 | 1.31 |
| | Static Air Permeability After abrasion test (L/dm2/min) | | 3.10 | 3.64 | 3.10 | 3.98 |
| | Change in Static Air Permeability After abrasion test | | 1.40 | 1.20 | 1.03 | 3.04 |
| | Dynamic Air Permeability (mm/sec) | | 452 | 588 | 660 | 233 |
| | Exponent | | 1.29 | 1.19 | 1.31 | 1.89 |

INDUSTRIAL APPLICABILITY

The airbag base fabric can be suitably used for an airbag for a driver's seat, an airbag for a passenger's seat, an airbag for a rear seat and an airbag for side collision as well as an airbag for a pedestrian even when being non-coated.

The invention claimed is:

1. A non-coated airbag base fabric satisfying characteristics A to E:
   (A) a cross-sectional deformation (WR), calculated by formula (1), of multifilament warp threads constituting a textile is 4.0 to 6.0, $$WR=\text{(major axis of warp thread cross section in textile)/(minor axis of warp thread cross section in textile)} \quad (1)$$

(B) a cross-sectional deformation (FR), calculated by formula (2), of multifilament weft threads constituting the textile is 2.4 to 4.0, $$FR=\text{(major axis of weft thread cross section in textile)/(minor axis of weft thread cross section in textile)} \quad (2)$$

(C) a single fiber cross-sectional shape of the multifilament threads constituting the textile is substantially circular,
   (D) the multifilament threads constituting the textile have total fineness of 145 to 720 dtex, single fiber fineness of 2 to 7 dtex, and tensile strength of 6.5 to 8.5 cN/dtex, and
   (E) dynamic air permeability measured according to ASTM D 6476-02 is 100 to 1000 mm/sec.

2. The airbag base fabric according to claim 1, wherein the warp thread cross-sectional deformation (WR) calculated by formula (1) is 4.3 to 5.7, and the weft thread cross-sectional deformation (WR) calculated by formula (2) is 2.6 to 3.7.

3. The airbag base fabric according to claim 1, wherein static air permeability measured under a test differential pressure of 500 Pa according to a fragile faun method of JIS L 1096 is 0.1 to 5.0 L/dm²/min.

4. The airbag base fabric according to claim 1, wherein a warp thread cover factor (WCF) is calculated by formula (3), a weft thread cover factor (FCF) is calculated by formula (4), and a sum (CF) of WCF and FCF, calculated by formula (5), is 2000 to 2400:

$$WCF=\text{(total fineness of warp threads constituting textile (dtex))}^{1/2} \times \text{(Warp thread density (number of threads/2.54 cm))} \quad (3)$$

$$FCF=\text{(total fineness of weft threads constituting textile (dtex))}^{1/2} \times \text{(Weft thread density (number of threads/2.54 cm))} \quad (4)$$

$$WCF+FCF=CF \quad (5).$$

5. An airbag using the airbag base fabric according to claim 1.

6. A non-coated airbag base fabric obtained by using synthetic fiber multifilament threads in which total fineness is 150 to 700 dtex, single fiber fineness is 2 to 7 dtex, tensile strength of multifilament threads is 8.0 to 9.5 cN/dtex, and the single fiber cross-sectional shape is circular, satisfying A to D:
   (A) a cross-sectional deformation (WR), calculated by formula (1), of multifilament warp threads constituting a textile is 4.0 to 6.0, $$WR=\text{(major axis of warp thread cross section in textile)/(minor axis of warp thread cross section in textile)} \quad (1)$$

(B) a cross-sectional deformation (FR), calculated by formula (2), of multifilament weft threads constituting the textile is 2.4 to 4.0, $$FR=\text{(major axis of weft thread cross section in textile)/(minor axis of weft thread cross section in textile)} \quad (2)$$

(C) a single fiber cross-sectional shape of the multifilament threads constituting the textile is substantially circular such that single fibers at a surface of the textile, at portions not in contact with adjacent single fibers, are arc-shaped, and
   (D) dynamic air permeability measured according to ASTM D 6476-02 is 100 to 1000 mm/sec.

7. The airbag base fabric according to claim 6, wherein the warp thread cross-sectional deformation (WR) calculated by formula (1) is 4.3 to 5.7, and the weft thread cross-sectional deformation (WR) calculated by formula (2) is 2.6 to 3.7.

8. The airbag base fabric to claim 6, wherein static air permeability measured under a test differential pressure of 500 Pa according to a fragile form method of JIS L 1096 is 0.1 to 5.0 L/dm²/min.

9. The airbag base fabric according to claim 6, wherein a warp thread cover factor (WCF) is calculated by formula (3), a weft thread cover factor (FCF) is calculated by formula (4), and a sum (CF) of WCF and FCF, calculated by formula (5), is 2000 to 2400:

$$WCF=\text{(total fineness of warp threads constituting textile (dtex))}^{1/2} \times \text{(Warp thread density (number of threads/2.54 cm))} \quad (3)$$

$$FCF=\text{(total fineness of weft threads constituting textile (dtex))}^{1/2} \times \text{(Weft thread density (number of threads/2.54 cm))} \quad (4)$$

$$WCF+FCF=CF \quad (5).$$

10. An airbag using the airbag base fabric according to claim 6.

* * * * *